US011054612B2

(12) United States Patent
Zhang et al.

(10) Patent No.: US 11,054,612 B2
(45) Date of Patent: *Jul. 6, 2021

(54) CAMERA LENS ASSEMBLY

(71) Applicant: ZHEJIANG SUNNY OPTICAL CO., LTD, Ningbo (CN)

(72) Inventors: Kaiyuan Zhang, Ningbo (CN); Fujian Dai, Ningbo (CN)

(73) Assignee: ZHEJIANG SUNNY OPTICAL CO., LTD ( * ) Notice: Subject to any disclaimer, the term of this patent is extended or adjusted under 35 U.S.C. 154(b) by 0 days.

This patent is subject to a terminal disclaimer.

(21) Appl. No.: 15/766,507

(22) PCT Filed: Jul. 19, 2017

(86) PCT No.: PCT/CN2017/093501
§ 371 (c)(1),
(2) Date: Apr. 6, 2018

(87) PCT Pub. No.: WO2018/153012
PCT Pub. Date: Aug. 30, 2018

(65) Prior Publication Data
US 2020/0241246 A1 Jul. 30, 2020

(30) Foreign Application Priority Data

Feb. 23, 2017 (CN) .......................... 201710098954.4
Feb. 23, 2017 (CN) .......................... 201720164786.X

(51) Int. Cl.
*G02B 13/00* (2006.01)
*G02B 13/18* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS 9,019,635 B2    4/2015   Tsai et al.
9,606,326 B2    3/2017   Tang et al.
9,720,210 B2    8/2017   Ota
(Continued)

FOREIGN PATENT DOCUMENTS

CN    104423017 A    3/2015
CN    105319688 A    2/2016
(Continued)

*Primary Examiner* — George G King
(74) *Attorney, Agent, or Firm* — Barnes & Thornburg LLP

(57) ABSTRACT

A camera lens assembly, having a total effective focal length f and an entrance pupil diameter EPD, and including sequentially, from an object side to an image side along an optical axis, a first lens, a second lens, a third lens, a fourth lens, a fifth lens, and a sixth lens, wherein the first lens has a positive focal power, the second lens has a negative focal power, the third lens has a positive focal power, the fourth lens has a positive focal power or a negative focal power, the fifth lens has a positive focal power or a negative focal power, and the sixth lens has a negative focal power. In addition, the total effective focal length f and the entrance pupil diameter EPD satisfy: f/EPD≤1.8.

15 Claims, 24 Drawing Sheets

(56) References Cited

U.S. PATENT DOCUMENTS

| | | | |
|---|---|---|---|
| 2015/0054994 A1 | 2/2015 | Tsai et al. | |
| 2015/0260961 A1 | 9/2015 | Ota et al. | |
| 2015/0338607 A1 | 11/2015 | Liao et al. | |
| 2016/0004050 A1* | 1/2016 | Tang | G02B 13/0045 348/374 |
| 2016/0033747 A1 | 2/2016 | Tang et al. | |
| 2016/0116715 A1 | 4/2016 | Ota | |
| 2016/0187622 A1* | 6/2016 | Huang | G02B 13/18 348/335 |
| 2016/0341929 A1 | 11/2016 | Liu et al. | |
| 2017/0219803 A1* | 8/2017 | Lee | G02B 5/208 |
| 2018/0074294 A1* | 3/2018 | Hsueh | G02B 27/0025 |

FOREIGN PATENT DOCUMENTS

| | | | |
|---|---|---|---|
| CN | 106168700 A | 11/2016 | |
| TW | 1589921 | * 7/2017 | G02B 27/0025 |

* cited by examiner

CAMERA LENS ASSEMBLY

CROSS-REFERENCE TO RELATED APPLICATIONS

This application is a U.S. national counterpart application of international application serial No. PCT/CN2017/093501 filed Jul. 19, 2017, which claims priority to Chinese Patent Application No. 201710098954.4 and Chinese Patent Application No. 201720164786.X, both of which were filed Feb. 23, 2017. The disclosures of PCT/CN2017/093501 and Chinese Patent Application Nos. 201710098954.4 and 201720164786.X are hereby incorporated by reference.

TECHNICAL FIELD

The present disclosure relates to a camera lens assembly, specifically to a camera lens assembly composed of six lenses.

BACKGROUND

Recently, with the development of science and technology, portable electronic products are on the rise, and portable electronic products with a camera function have become more popular among people. Therefore, there is an increasing market demand for a camera lens assembly applicable to the portable electronic products. Since the portable electronic products tend to be miniaturized, the total length of a lens assembly is limited, thereby increasing the difficulty in designing the lens assembly. Currently, a commonly used photosensitive element for a camera lens assembly is generally a CCD (Charge-Coupled Device) or CMOS (Complementary Metal-Oxide Semiconductor). As the CCD and CMOS elements are having higher performance and smaller size, higher requirements for high image quality and miniaturization are imposed on the camera lens assembly matching the portable electronic products.

To satisfy the miniaturization requirement, a typically configured F-number of an existing lens assembly (focal length of a lens assembly/diameter of an effective aperture of a lens assembly) is 2.0 or above, to achieve a small size of the lens assembly while having a good optical performance. However, with the constant development of smart phones and other portable electronic products, higher requirements are imposed on an imaging lens assembly, especially for the situations such as lack of light (e.g. rainy days, dusk), hand trembling, thus a F-number of 2.0 or above has been unable to meet imaging requirements of a higher class.

Therefore, there is a need for a camera lens assembly applicable to the portable electronic products, having an ultra-thin large aperture, an excellent image quality and a low sensitivity.

SUMMARY

The technical solution provided by the present application at least partially solves the technical problem described above.

According to an aspect, the present application provides a camera lens assembly, the camera lens assembly having a total effective focal length f and an entrance pupil diameter EPD, and from an object side to an image side along an optical axis sequentially comprising a first lens, a second lens, a third lens, a fourth lens, a fifth lens and a sixth lens, wherein the first lens has a positive focal power, the second lens has a negative focal power, the third lens has a positive focal power, the fourth lens has a positive focal power or a negative focal power, the fifth lens has a positive focal power or a negative focal power, and the sixth lens has a negative focal power. In addition, the total effective focal length f and the entrance pupil diameter EPD satisfy: f/EPD≤1.8.

In one example, an object side surface of the first lens may be a convex surface; an image side surface of the second lens may be a concave surface; an image side surface of the fourth lens may be a convex surface; and an image side surface of the sixth lens is a concave surface at a paraxial and has at least one point of inflexion.

In the present application, a plurality of pieces (for example, six pieces) of lenses is used. By properly allocating a relationship between the effective focal length and the entrance pupil diameter of the camera lens assembly, the system has a large aperture advantage in the process of increasing an amount of light admitted, an image effect in a dark environment is enhanced, while an aberration of an edge field-of-view is reduced.

According to another aspect, the present application provides a camera lens assembly. The camera lens assembly from an object side to an image side along an optical axis sequentially comprises a first lens, a second lens, a third lens, a fourth lens, a fifth lens and a sixth lens, wherein an air spacing between the fifth lens and the sixth lens on the optical axis T56 and a center thickness of the sixth lens CT6 satisfy: 0.3≤T56/CT6≤0.8. In one example, the first lens has a positive focal power, an object side surface of the first lens is a convex surface; the second lens has a negative focal power, an image side surface of the second lens is a concave surface; the third lens has a positive focal power; the fourth lens has a positive focal power or a negative focal power, an image side surface of the fourth lens is a convex surface; the fifth lens has a positive focal power or a negative focal power; and the sixth lens has a negative focal power.

A camera lens assembly arrangement according to the above may effectively compress the size of the system to ensure an ultra-thin feature of the lens assembly by properly distributing an air spacing between the lens assemblies.

For example, an axial distance from the object side surface of the first lens to an image plane TTL of the camera lens assembly and half a diagonal length of an effective pixel area on the image plane ImgH of the camera lens assembly satisfy: TTL/ImgH≤1.6.

For example, an aperture stop is provided between the first lens and the second lens, wherein an axial distance from the aperture stop to the image plane SL of the camera lens assembly and the axial distance from the object side surface of the first lens to the image plane TTL of the camera lens assembly satisfy: 0.7≤SL/TTL≤0.9.

For example, an effective focal length of the first lens f1 and an effective focal length of the third lens f3 may satisfy: 0.2<f1/f3<0.8, and the effective focal length of the third lens f3 and an effective focal length of the fourth lens f4 may satisfy: −0.2<f3/f4≤2.1. A combined focal length of the fourth lens and the fifth lens f45 may satisfy: |f/f45|≤1.3.

For example, a center thickness of the third lens CT3, a center thickness of the fifth lens CT5 and the center thickness of the sixth lens CT6 may satisfy: 0.4≤CT3/(CT5+CT6) ≤0.7. A center thickness of the first lens CT1 and the center thickness of the third lens CT3 may satisfy: 1.0≤CT1/CT3≤2.0.

For example, a maximum effective radius of the object side surface of the first lens DT11 and a maximum effective radius of the image side surface of the second lens DT22 satisfy: $0.1 \leq DT11/DT22 \leq 1.6$.

For example, a radius of curvature of the object side surface of the first lens R1 and a radius of curvature of the image side surface of the second lens R4 satisfy: $0 < R1/R4 < 1.5$. A radius of curvature R12 of an image side surface of the sixth lens satisfies: $2.5 < f/R12 < 4.0$.

The camera lens assembly with the above configuration may further have at least one of the beneficial effects of effectively balancing a spherical aberration, enabling the optical system with an ability of balancing a field curvature well and having an ability of eliminating a distortion well.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

Figure 1:
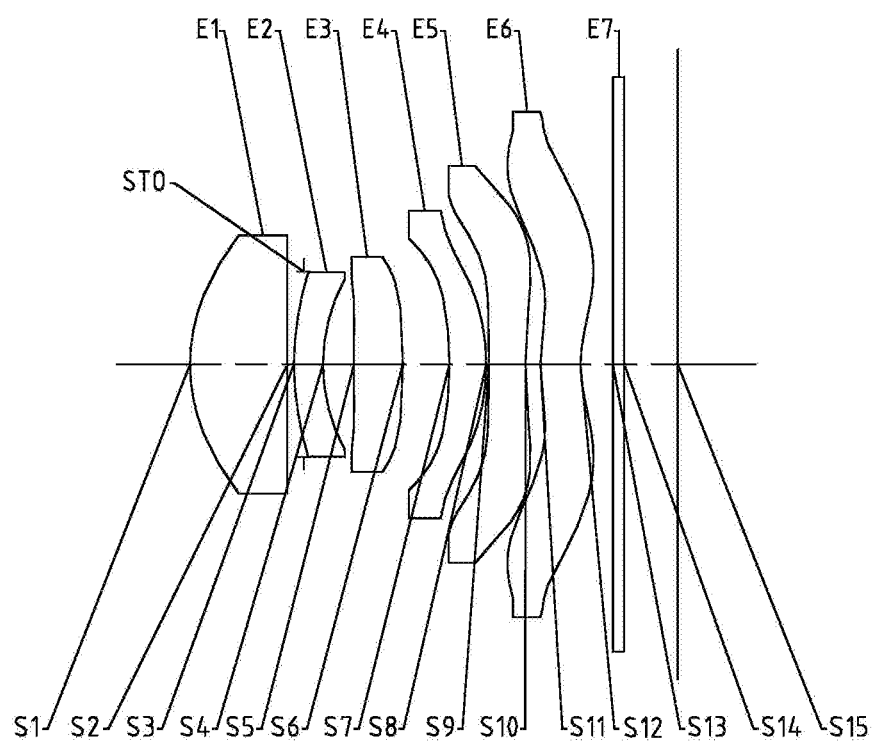
FIG. 1 is a schematic structural diagram illustrating a camera lens assembly according to Embodiment 1 of the present application.

For a better understanding of the present application, various aspects of the present application will be described in more detail with reference to the accompanying drawings. It should be understood that these detailed description is merely illustrative of the exemplary embodiments of the present application and is not intended to limit the scope of the present application in any way. Throughout the specification, the same reference numerals refer to the same elements. The expression "and/or" includes any and all combinations of one or more of the associated listed items.

It should be understood that although the terms "first, second and the like" may be used herein to describe various elements, components, regions, layers and/or segments, such elements, components, regions, layers and/or segments should not be limited by these terms. These terms are used only to distinguish one element, component, region, layer or segment from another element, component, region, layer or segment. Accordingly, the first element, the first component, the first region, the first layer or the first segment discussed below may be referred to as the second element, the second component, the second region, the second layer or the second segment, without departing from the teachings of the present application.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. Expressions, such as "at least one of," when preceding a list of features, modify the entire list of features rather than an individual feature in the list.

Further, the use of "may," when describing embodiments of the present application, relates to "one or more embodiments of the present application." In addition, the term "exemplary" is intended to refer to an example or illustration.

As used herein, the terms "substantially," "about" and similar terms are used as a term of approximation and not as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present application belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present application and the features in the embodiments may be combined with each other on a non-conflict basis. The present application will be described below in detail with reference to the accompanying drawings and in combination with the embodiments.

The present application will be further described below in combination with specific embodiments.

The camera lens assembly according to an exemplary embodiment of the present application has, for example, six lenses, i.e., a first lens, a second lens, a third lens, a fourth lens, a fifth lens, and a sixth lens. The six lenses are arranged in sequence from an object side to an image side along an optical axis.

According to the embodiment, the first lens has a positive focal power, and its object side surface is a convex surface. The second lens has a negative focal power, and its image side surface is a concave surface. The third lens has a positive focal power; the fourth lens has a positive focal power or a negative focal power, and its image side surface is a convex surface. The fifth lens has a positive focal power or a negative focal power. The sixth lens has a negative focal power, and its image side surface is a concave surface at the paraxial and has at least one point of inflexion, i.e., the lens has a variation tendency from center to edge, changing from concave to convex or from concave to convex then to convex.

A total effective focal length f and an entrance pupil diameter EPD of the camera lens assembly according to the exemplary embodiment of the present application may satisfy: $f/EPD \leq 1.8$, for example, $1.69 \leq f/EPD \leq 1.8$. The system may have a large aperture advantage in the process of increasing an amount of light admitted, thus reducing an aberration of an edge field-of-view, while enhancing an image effect in a dark environment. Alternatively, an axial distance from the object side surface of the first lens to an image plane TTL of the camera lens assembly and half a diagonal length of an effective pixel area on the image plane ImgH of the camera lens assembly may satisfy: $TTL/ImgH \leq 1.6$, for example, $1.53 \leq TTL/ImgH \leq 1.6$. The total size of the camera lens assembly may be effectively compressed, thus ensuring an ultra-thin feature and miniaturization of the camera lens assembly.

In an exemplary embodiment, an aperture stop may be provided between the first lens and the second lens. An axial distance from the aperture stop to the image plane SL of the camera lens assembly and the axial distance from the object side surface of the first lens to the image plane TTL of the camera lens assembly may satisfy: $0.7 \leq SL/TTL \leq 0.9$, for example, $0.76 \leq SL/TTL \leq 0.86$. Providing the aperture stop as a design variable between the first lens and the second lens may effectively enhance the system's ability of eliminating an aberration.

A maximum effective radius of the object side surface of the first lens DT11 and a maximum effective radius of the image side surface of the second lens DT22 may satisfy: $0.1 \leq DT11/DT22 \leq 1.6$, for example DT11 and DT22 may further satisfy: $1.19 \leq DT11/DT22 \leq 1.51$. The aperture of the first lens and the second lens are constrained by light admitted so that the aperture of the front end of the optical system is small, thus may effectively reduce the front end opening of a module.

In addition, a radius of curvature of the object side surface of the first lens R1 and a radius of curvature of the image side surface of the second lens R4 may satisfy: $0<R1/R4<1.5$, for example R1 and R4 may further satisfy: $0.49 \leq R1/R4 \leq 1.08$. By properly configuring the radius of curvature of the object side surface of the first lens R1 and the radius of curvature of the image side surface of the second lens R4, the first lens and the second lens are designed as an optical unit, thus effectively increasing the system's ability of eliminating astigmatism.

An effective focal length of the first lens f1 and an effective focal length of the third lens f3 may satisfy: $0.2<f1/f3<0.8$, for example, f1 and f3 may further satisfy: $0.32 \leq f1/f3 \leq 0.65$. By properly configuring the effective focal length of the first lens f1 and the effective focal length of the third lens f3, the first lens and the third lens may properly bear a deflection angle to reduce a primary aberration of the system.

The effective focal length of the third lens f3 and an effective focal length of the fourth lens f4 may satisfy: $-0.2<f3/f4 \leq 2.1$, for example, f3 and f4 may further satisfy: $-0.13 \leq f3/f4 \leq 2.02$. As is known to those skilled in the art, the spherical aberration is one of the most important factors limiting resolution of the lens. In the present application, it is possible to effectively balance the spherical aberration by introducing a negative lens with a proper focal power, thereby effectively improving an image quality.

The total effective focal length f of the camera lens assembly and a combined focal length of the fourth lens and the fifth lens f45 may satisfy: $|f/f45| \leq 1.3$, for example, f and f45 may further satisfy: $0.1 \leq |f/f45| \leq 1.23$. By properly configuring the combined focal length of the fourth lens and the fifth lens, the optical system may have an ability of balancing a field curvature well.

In practice, the thickness of each lens may be optimized. For example, a center thickness of the first lens CT1 and a center thickness of the third lens CT3 may satisfy: $1.0 \leq CT1/CT3 \leq 2.0$, for example, $1.07 \leq CT1/CT3 \leq 1.99$. By properly configuring the center thickness of the first lens CT1 and the center thickness of the third lens CT3, it is possible to make the camera lens assembly to have an ability of eliminating a distortion well while ensuring miniaturization. Also for example, the center thickness of the third lens CT3, a center thickness of the fifth lens CT5 and a center thickness of the sixth lens CT6 may satisfy: $0.4 \leq CT3/(CT5+CT6) \leq 0.7$, for example, $0.46 \leq CT3/(CT5+CT6) \leq 0.68$. By properly configuring the center thickness of each lens, the camera lens assembly may have an ability of eliminating a distortion well.

In addition, an air spacing distance between the lenses on the optical axis may be optimized. For example, an air spacing between the fifth lens and the sixth lens on the optical axis T56 and the center thickness of the sixth lens CT6 may satisfy: $0.3 \leq T56/CT6 \leq 0.8$, for example, $0.35 \leq T56/CT6 \leq 0.75$. By properly configuring the air spacing between the fifth lens and the sixth lens on the optical axis, the size of the camera lens assembly may be effectively compressed, thereby ensuring an ultra-thin feature of the camera lens assembly. In order to ensure that the camera lens assembly can be easily matched with a commonly-used chip, it is necessary to properly configure a radius of curvature of an image side surface of the sixth lens. For example, the total effective focal length f of the camera lens assembly and the radius of curvature of the image side surface of the sixth lens R12 may satisfy: $2.5<f/R12<4.0$. For example, f and R12 may further satisfy: $2.55 \leq f/R12 \leq 3.66$.

The camera lens assembly according to the exemplary embodiments of the present application may use a plurality of lenses, for example, six as used in the present application. By properly allocating the focal power, surface form of each lens, axial spacing between lenses, etc., it is possible to effectively increase viewing angle of the camera lens assembly, ensure miniaturization of the lens assembly and improve an image quality, thus making the camera lens assembly more conducive to production and processing and may be applicable to portable electronic products. In the embodiments of the present application, at least one of the lens surfaces of the lenses is an aspheric lens surface. The feature of the aspheric lens is: from the center of the lens to the periphery, the curvature is continuously changing. Unlike the spherical lens with a certain curvature from the center of the lens to the periphery, the aspheric lens has a better radius of curvature feature, which has an advantage of improving a distorted aberration and improving an astigmatic aberration, capable of making the field-of-view larger and more realistic. Using the aspheric lens, an aberration at the time of imaging can be eliminated as much as possible, thereby improving the image quality.

However, it should be understood by those skilled in the art that the various results and advantages described below may be obtained by changing the constituting numbers of the lens assemblies without departing from the technical solution claimed by the present application. For example, although six lenses are described as an example in the embodiment, the camera lens assembly is not limited to including six lenses. If desired, the camera lens assembly may also include other numbers of lenses.

Specific embodiments of the camera lens assembly that may be applied to the above-described embodiments are further described below with reference to FIG. 1 to FIG. 24D.

Embodiment 1

The camera lens assembly according to Embodiment 1 of the present application is described below with reference to FIG. 1 to FIG. 2D.

As shown in FIG. 1, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 1 shows a surface form, a radius of curvature, a thickness, a material, and a conic constant of each lens of the camera lens assembly of Embodiment 1, wherein the unit for the radius of curvature and the thickness is millimeter (mm)

TABLE 1

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 1.7416 | 0.9481 | 1.53 | 70.4 | 0.5026 |
| S2 | aspheric | 14.3936 | 0.1592 | | | −54.3176 |
| STO | spherical | infinite | −0.0958 | | | |
| S3 | aspheric | 2.3625 | 0.2826 | 1.67 | 20.4 | −15.8326 |
| S4 | aspheric | 1.6083 | 0.3015 | | | −8.5129 |
| S5 | aspheric | 20.0343 | 0.4771 | 1.55 | 56.1 | 51.7711 |
| S6 | aspheric | −8.9109 | 0.4533 | | | 64.5158 |
| S7 | aspheric | −4.3887 | 0.3600 | 1.64 | 23.5 | 11.4274 |
| S8 | aspheric | −2.0567 | 0.0250 | | | −0.2048 |
| S9 | aspheric | −16.5545 | 0.3560 | 1.64 | 23.5 | 98.9932 |
| S10 | aspheric | 4.0000 | 0.1460 | | | −86.1439 |
| S11 | aspheric | 1.5590 | 0.3900 | 1.54 | 55.8 | −12.4428 |
| S12 | aspheric | 1.1476 | 0.3163 | | | −5.4326 |
| S13 | spherical | Infinite | 0.1110 | 1.52 | 64.2 | |
| S14 | spherical | Infinite | 0.5199 | | | |
| S15 | spherical | infinite | | | | |

As may be obtained from Table 1, the radius of curvature of the object side surface of the first lens E1 R1 and the radius of curvature of the image side surface of the second lens E2 R4 satisfy: R1/R4=1.08.

In this embodiment, six lenses are used as an example. By properly allocating the focal length and the surface form of each lens, a field-of-view angle is effectively enlarged, and a total length of the lens assembly is shortened, thereby ensuring the wide angle and the miniaturization of the lens assembly. At the same time, various types of aberrations are corrected and thus the resolution and the image quality of the lens assembly are improved. The surface form x of each aspheric surface is defined by the following formula:

$$x = \frac{ch^2}{1 + \sqrt{1 - (k+1)c^2h^2}} + \sum A_i h^i \quad 1)$$

Here, c is the paraxial curvature of the aspheric surface, i.e., the reciprocal of the radius of curvature in the above table 1, h is the height of any point on the aspheric surface to the main optical axis, k is the conic constant, and $A_i$ is the correction coefficient of the $i^{th}$ order of the aspheric surface. Table 2 below shows higher-order coefficients $A_4$, $A_6$, $A_8$, $A_{10}$, $A_{12}$, $A_{14}$, $A_{16}$, $A_{18}$ and $A_{20}$ applicable to each lens surface S1 to S12 in Embodiment 1.

TABLE 2

| surface number | A4 | A6 | A8 | A10 | A12 |
|---|---|---|---|---|---|
| S1 | −2.7378E−02 | 4.4322E−02 | −2.1155E−01 | 4.8932E−01 | −7.2301E−01 |
| S2 | −1.6820E−01 | 6.2779E−01 | −1.7885E+00 | 3.8866E+00 | −6.1513E+00 |
| S3 | −7.3309E−02 | 4.7741E−01 | −1.5693E+00 | 4.2745E+00 | −8.5838E+00 |
| S4 | 1.5271E−01 | −3.6754E−01 | 2.6973E+00 | −1.4287E+01 | 4.9083E+01 |
| S5 | −6.3567E−02 | 1.7370E−02 | −3.3922E−01 | 1.2938E+00 | −2.1016E+00 |
| S6 | −5.6980E−02 | −2.3016E−02 | 1.4058E−02 | −2.7622E−01 | 9.1840E−01 |
| S7 | −6.4796E−02 | −2.1160E−02 | 5.8456E−01 | −2.1719E+00 | 3.7855E+00 |
| S8 | −3.1421E−02 | 1.0684E−01 | −3.9403E−02 | −4.7733E−01 | 9.1546E−01 |
| S9 | 6.9616E−02 | −1.2794E−01 | 2.1492E−02 | −1.8027E−01 | 4.1023E−01 |
| S10 | 8.0893E−03 | 3.2438E−02 | −1.9090E−01 | 2.3018E−01 | −1.5257E−01 |
| S11 | −4.2159E−01 | 3.6345E−01 | −2.2341E−01 | 9.9536E−02 | −2.9896E−02 |
| S12 | −3.0311E−01 | 2.7008E−01 | −2.0089E−01 | 1.0520E−01 | −3.5920E−02 |

| surface number | A14 | A16 | A18 | A20 |
|---|---|---|---|---|
| S1 | 6.6669E−01 | −3.7475E−01 | 1.1711E−01 | −1.5683E−02 |
| S2 | 6.6718E+00 | −4.6434E+00 | 1.8563E+00 | −3.2297E−01 |
| S3 | 1.1671E+01 | −9.9976E+00 | 4.8345E+00 | −1.0013E+00 |
| S4 | −1.0625E+02 | 1.4034E+02 | −1.0342E+02 | 3.2683E+01 |
| S5 | −7.2968E−01 | 7.5445E+00 | −1.0051E+01 | 4.5534E+00 |
| S6 | −1.6077E+00 | 1.6172E+00 | −8.9652E−01 | 2.2020E−01 |
| S7 | −3.8304E+00 | 2.3564E+00 | −8.2886E−01 | 1.2908E−01 |
| S8 | −7.1795E−01 | 2.8527E−01 | −5.6420E−02 | 4.3527E−03 |
| S9 | −3.5879E−01 | 1.5649E−01 | −3.4155E−02 | 2.9800E−03 |
| S10 | 6.2678E−02 | −1.5878E−02 | 2.2704E−03 | −1.3964E−04 |
| S11 | 5.8615E−03 | −7.2313E−04 | 5.1376E−05 | −1.6185E−06 |
| S12 | 7.8083E−03 | −1.0446E−03 | 7.8795E−05 | −2.5786E−06 |

Table 3 below shows effective focal lengths of the lenses f1 to f6, a total effective focal length f of the camera lens assembly and a half field-of-view angle HFOV of the camera lens assembly of Embodiment 1. In this embodiment, the half field-of-view angle HFOV of the camera lens assembly may be set as: HFOV=36.36°.

TABLE 3

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.67 | −8.89 | 11.36 | 5.66 | −4.96 | −12.12 | 3.99 | 36.36 |

According to Table 3, an effective focal length of the first lens E1 f1 and an effective focal length of the third lens E3 f3 satisfy: f1/f3=0.32. The effective focal length of the third lens E3 f3 and an effective focal length of the fourth lens E4 f4 satisfy: f3/f4=2.01. An total effective focal length f of the camera lens assembly and a combined focal length of the fourth lens E4 and the fifth lens E5 f45 satisfy: |f/f45|=0.1. Combining Table 1 and Table 3, the total effective focal length f of the camera lens assembly and a radius of curvature of the image side surface of the sixth lens R12 satisfy: f/R12=3.47.

In this embodiment, the total effective focal length f of the camera lens assembly and an entrance pupil diameter EPD of the camera lens assembly satisfy: f/EPD=1.7. An axial distance TTL from the object side surface of the first lens E1 to the image plane of the camera lens assembly and the half a diagonal length of an effective pixel area on the image plane ImgH of the camera lens assembly satisfy: TTL/ImgH=1.55. An axial distance SL of from an aperture stop to the image plane of the camera lens assembly and the axial distance TTL of the object side surface of the first lens E1 to the image plane of the camera lens assembly satisfy: SL/TTL=0.77, wherein the aperture stop is provided between the first lens E1 and the second lens E2. A center thickness of the third lens CT3 E3, a center thickness of the fifth lens CT5 E5 and a center thickness of the sixth lens CT6 E6 satisfy: CT3/(CT5+CT6)=0.64. A center thickness of the first lens CT1 E1 and the center thickness of the third lens CT3 E3 satisfy: CT1/CT3=1.99. An air spacing T56 of the fifth lens E5 and the sixth lens E6 on the optical axis and the center thickness of the sixth lens CT6 E6 satisfy: T56/CT6=0.37. A maximum effective radius of the object side surface of the first lens DT11 E1 and a maximum effective radius of the image side surface of the second lens DT22 E2 satisfy: DT11/DT22=1.51.

Figure 2A:
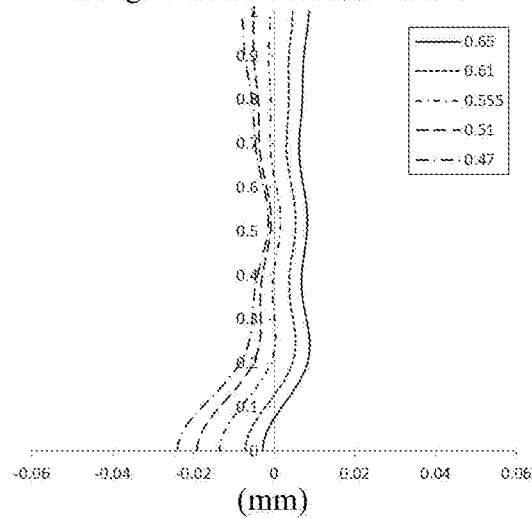
FIG. 2A shows a longitudinal aberration curve of the camera lens assembly according to Embodiment 1.
Figure 2B:
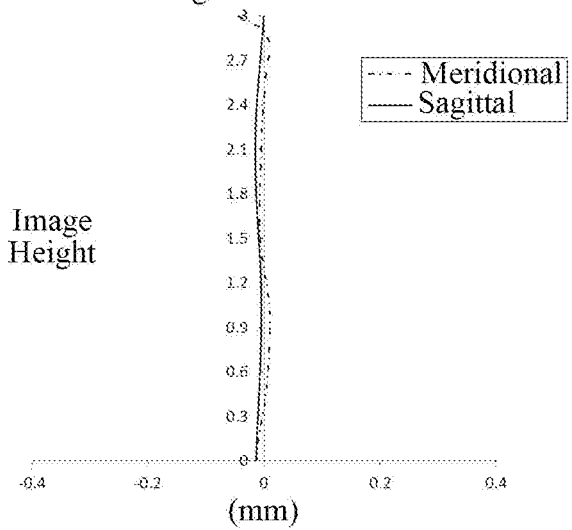
FIG. 2B shows an astigmatism curve of the camera lens assembly according to Embodiment 1.
Figure 2C:
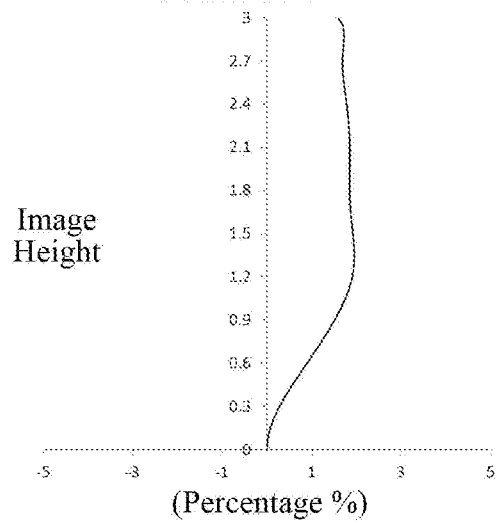
FIG. 2C shows a distortion curve of the camera lens assembly according to Embodiment 1.
Figure 2D:
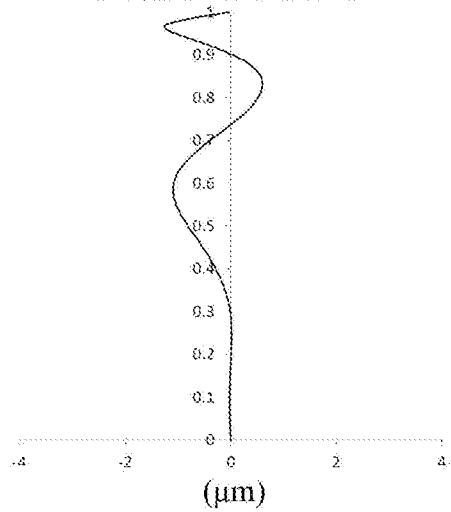
FIG. 2D shows a lateral color curve of the camera lens assembly according to Embodiment 1.

FIG. 2A shows a longitudinal aberration curve of the camera lens assembly according to Embodiment 1, representing deviations of focal points of light of different wavelengths converged after passing through a lens assembly. FIG. 2B shows an astigmatism curve of the camera lens assembly according to Embodiment 1, representing a curvature of a meridional image plane and a curvature of a sagittal image plane. FIG. 2C shows a distortion curve of the camera lens assembly according to Embodiment 1, representing amounts of distortion at different viewing angles. FIG. 2D shows a lateral color curve of the camera lens assembly according to Embodiment 1, representing deviations of different image heights on an image plane after light passes through the lens assembly. It can be seen from FIG. 2A to FIG. 2D that the camera lens assembly according to Embodiment 1 achieves good image quality.

Embodiment 2

Figure 3:
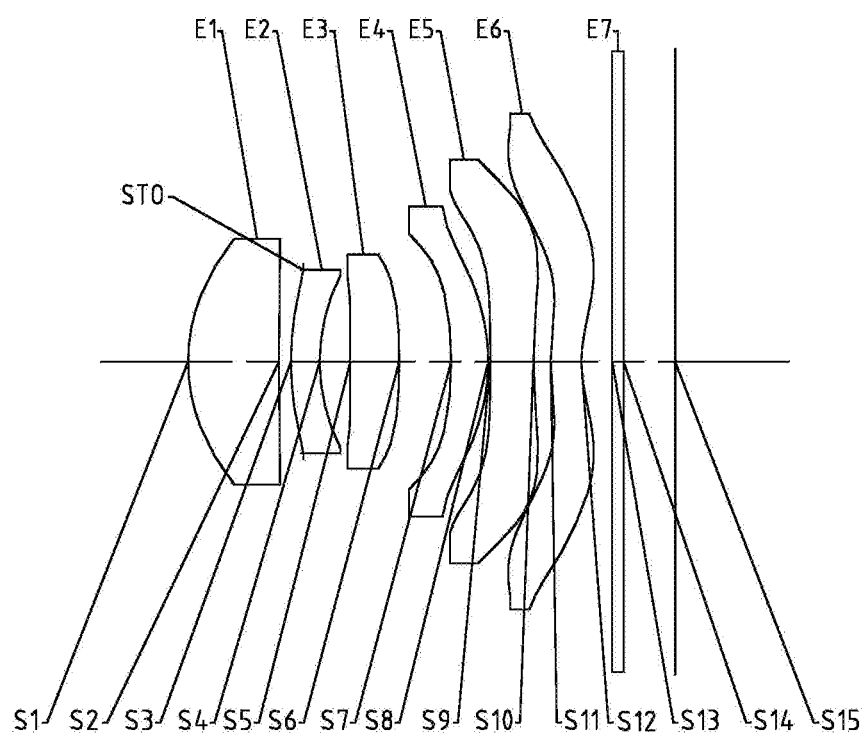
FIG. 3 is a schematic structural diagram illustrating a camera lens assembly according to Embodiment 2 of the present application.

The camera lens assembly according to Embodiment 2 of the present application is described below with reference to FIG. 3 to FIG. 4D. For the purpose of brevity, the description of parts similar to those in Embodiment 1 will be omitted. FIG. 3 is a schematic structural diagram illustrating a camera lens assembly according to Embodiment 2 of the present application.

As shown in FIG. 3, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 4 shows a surface form, a radius of curvature, a thickness, a material, and a conic constant of each lens of the camera lens assembly of Embodiment 1, wherein the unit for the radius of curvature and the thickness is millimeter (mm). Table 5 shows higher-order coefficients of the lens surfaces in Embodiment 2. Table 6 shows effective focal lengths of the lenses f1 to f6, a total effective focal length f of the camera lens assembly and a half field-of-view angle HFOV of the camera lens assembly of Embodiment 2. Here, the respective aspheric surface forms may be defined by the formula 1) given in the above embodiment.

TABLE 4

| Surface number | Surface form | radius of curvature | thickness | material refractive index | material Dispersion coefficient | conic constant |
|---|---|---|---|---|---|---|
| OBJ | spherical | infinite | infinite | | | |
| S1 | aspheric | 1.7259 | 0.8935 | 1.53 | 70.4 | 0.4305 |
| S2 | aspheric | 15.5079 | 0.2399 | | | −70.1137 |
| STO | spherical | infinite | −0.1222 | | | 0.0000 |
| S3 | aspheric | 2.6926 | 0.2826 | 1.67 | 20.4 | −17.6444 |
| S4 | aspheric | 1.7208 | 0.2998 | | | −9.3386 |
| S5 | aspheric | 26.1453 | 0.4827 | 1.55 | 56.1 | −29.7385 |
| S6 | aspheric | −6.9801 | 0.5114 | | | 41.3768 |
| S7 | aspheric | −3.9866 | 0.3649 | 1.64 | 23.5 | 3.8051 |
| S8 | aspheric | −1.9511 | 0.0200 | | | −0.5783 |
| S9 | aspheric | −17.0778 | 0.4239 | 1.64 | 23.5 | 97.9011 |
| S10 | aspheric | 6.6593 | 0.1696 | | | −84.9851 |
| S11 | aspheric | 2.0715 | 0.3013 | 1.54 | 55.8 | −22.9729 |
| S12 | aspheric | 1.1568 | 0.3042 | | | −7.7574 |
| S13 | spherical | infinite | 0.1110 | 1.52 | 64.2 | |
| S14 | spherical | infinite | 0.5075 | | | |
| S15 | spherical | infinite | | | | |

TABLE 5

| surface number | A4 | A6 | A8 | A10 | A12 |
|---|---|---|---|---|---|
| S1 | −2.5895E−02 | 4.4630E−02 | −1.8529E−01 | 4.0061E−01 | −5.6674E−01 |
| S2 | −6.7777E−02 | 1.5781E−01 | −2.8512E−01 | 4.0944E−01 | −4.6011E−01 |
| S3 | −2.8129E−02 | 1.5214E−01 | −4.8254E−01 | 1.5512E+00 | −3.5415E+00 |
| S4 | 1.4007E−01 | −3.8425E−01 | 2.4221E+00 | −1.1143E+01 | 3.4112E+01 |
| S5 | −7.2805E−02 | 1.8331E−01 | −1.7672E+00 | 8.4980E+00 | −2.4715E+01 |
| S6 | −2.8032E−02 | −2.3535E−01 | 1.2053E+00 | −4.3165E+00 | 9.7003E+00 |
| S7 | −6.8490E−02 | 8.3254E−02 | −6.1488E−02 | −1.4908E−01 | 1.5413E−01 |
| S8 | −2.6723E−02 | 1.4182E−01 | −2.4005E−01 | 1.7898E−01 | −3.8019E−02 |
| S9 | 6.9851E−02 | −2.2936E−01 | 1.8328E−01 | −9.0052E−02 | 6.0149E−02 |
| S10 | 1.4029E−01 | −3.5754E−01 | 3.6634E−01 | −2.4424E−01 | 1.1027E−01 |
| S11 | −2.4198E−01 | 8.1708E−02 | −9.7181E−03 | 5.7149E−03 | −5.0239E−03 |
| S12 | −1.9487E−01 | 8.2053E−02 | −1.8210E−02 | −3.3754E−03 | 4.3873E−03 |

| surface number | A14 | A16 | A18 | A20 |
|---|---|---|---|---|
| S1 | 5.0879E−01 | −2.8194E−01 | 8.7675E−02 | −1.1780E−02 |
| S2 | 3.6729E−01 | −1.8948E−01 | 5.4783E−02 | −6.5326E−03 |
| S3 | 5.2109E+00 | −4.6927E+00 | 2.3516E+00 | −5.0207E−01 |
| S4 | −6.7111E+01 | 8.1753E+01 | −5.6204E+01 | 1.6742E+01 |
| S5 | 4.4005E+01 | −4.6812E+01 | 2.7104E+01 | −6.4280E+00 |
| S6 | −1.3791E+01 | 1.2071E+01 | −5.9472E+00 | 1.2722E+00 |
| S7 | 1.1134E−01 | −2.4839E−01 | 1.4114E−01 | −2.7282E−02 |
| S8 | −1.9813E−02 | 1.3402E−02 | −2.8928E−03 | 2.1397E−04 |
| S9 | −5.0252E−02 | 2.5139E−02 | −6.0918E−03 | 5.6529E−04 |
| S10 | −3.3539E−02 | 6.5208E−03 | −7.2026E−04 | 3.3890E−05 |
| S11 | 1.9272E−03 | −3.7992E−04 | 3.8536E−05 | −1.6046E−06 |
| S12 | −1.4892E−03 | 2.4243E−04 | −1.8760E−05 | 5.2734E−07 |

TABLE 6

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.61 | −8.09 | 10.14 | 5.54 | −7.38 | −5.52 | 4.05 | 36.67 |

Figure 4A:
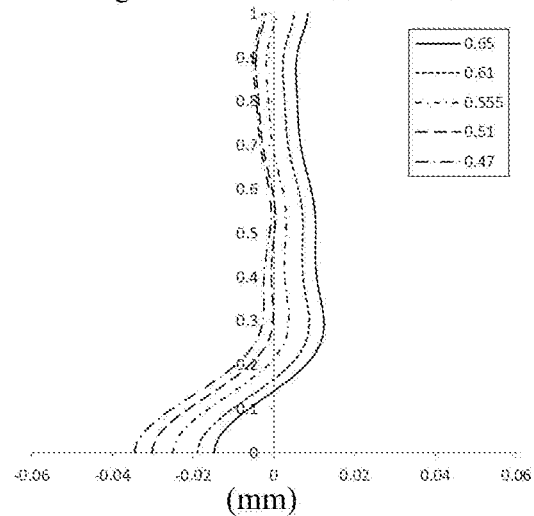
FIG. 4A shows a longitudinal aberration curve of the camera lens assembly according to Embodiment 2.
Figure 4B:
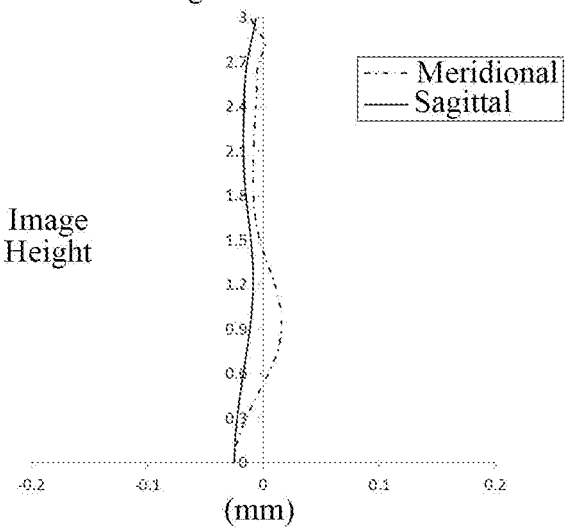
FIG. 4B shows an astigmatism curve of the camera lens assembly according to Embodiment 2.
Figure 4C:
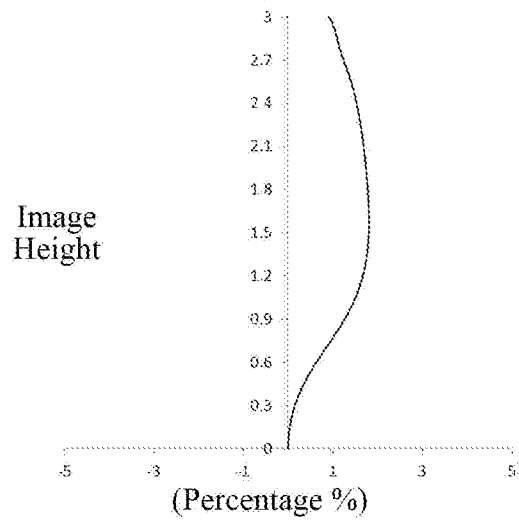
FIG. 4C shows a distortion curve of the camera lens assembly according to Embodiment 2.
Figure 4D:
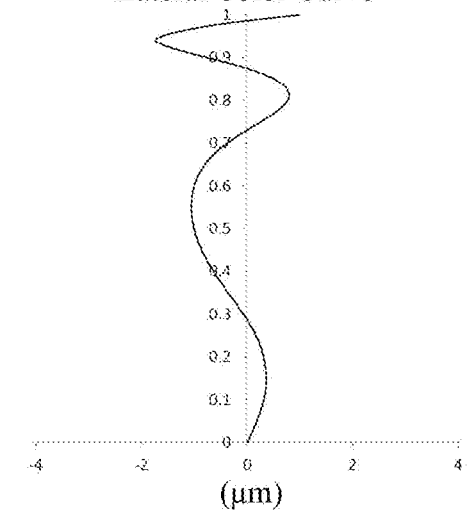
FIG. 4D shows a lateral color curve of the camera lens assembly according to Embodiment 2.

FIG. 4A shows a longitudinal aberration curve of the camera lens assembly according to Embodiment 2, representing deviations of focal points of light of different wavelengths converged after passing through a lens assembly. FIG. 4B shows an astigmatism curve of the camera lens assembly according to Embodiment 2, representing a curvature of a meridional image plane and a curvature of a sagittal image plane. FIG. 4C shows a distortion curve of the camera lens assembly according to Embodiment 2, representing amounts of distortion at different viewing angles. FIG. 4D shows a lateral color curve of the camera lens assembly according to Embodiment 2, representing deviations of different image heights on an image plane after light passes through the lens assembly. It can be seen from FIG. 4A to FIG. 4D that the camera lens assembly according to Embodiment 2 achieves good image quality.

Embodiment 3

Figure 5:
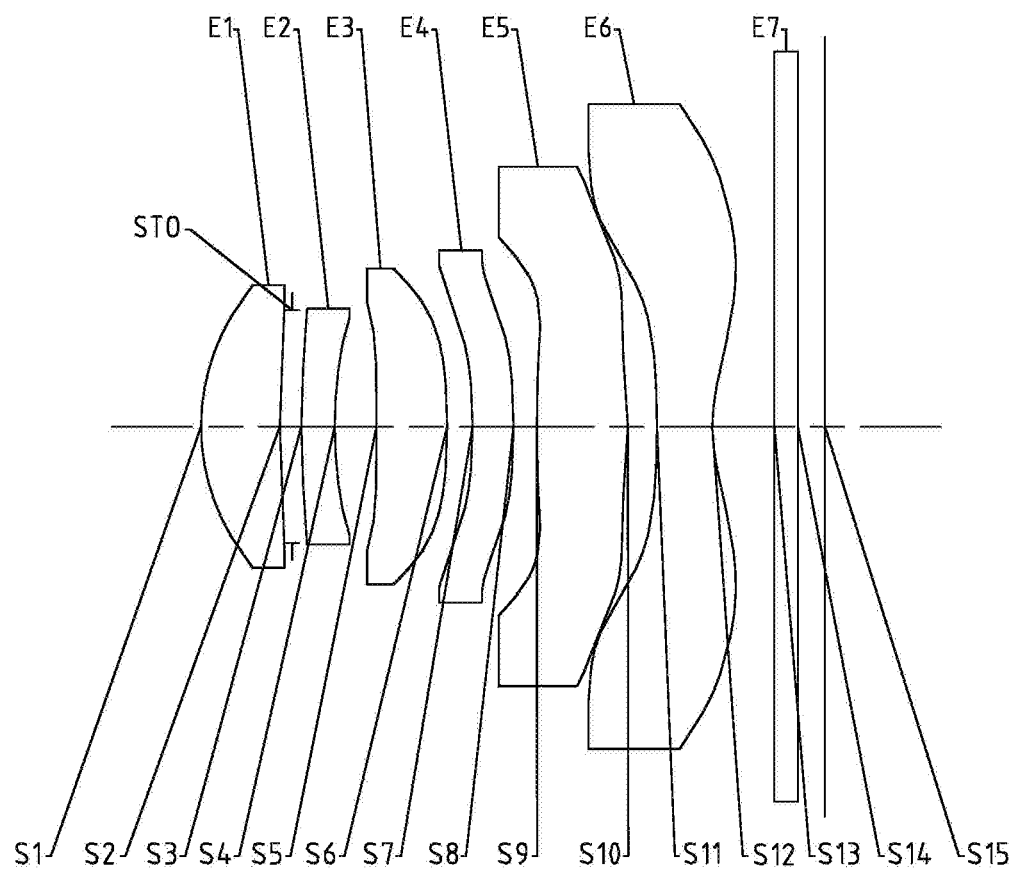
FIG. 5 is a schematic structural diagram illustrating a camera lens assembly according to Embodiment 3 of the present application.

The camera lens assembly according to Embodiment 3 of the present application is described below with reference to FIG. 5 to FIG. 6D. FIG. 5 is a schematic structural diagram illustrating a camera lens assembly according to Embodiment 3 of the present application.

As shown in FIG. 5, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 7 shows a surface form, a radius of curvature, a thickness, a material, and a conic constant of each lens of the camera lens assembly of Embodiment 3, wherein the unit for the radius of curvature and the thickness is millimeter (mm). Table 8 shows higher-order coefficients of the lens surfaces in Embodiment 3. Table 9 shows effective focal lengths of the lenses f1 to f6, a total effective focal length f of the camera lens assembly and a half field-of-view angle HFOV of the camera lens assembly of Embodiment 3. Here, the respective aspheric surface forms may be defined by the formula 1) given in the above embodiment.

TABLE 7

| surface number | surface form | radius of curvature | thickness | material | | conic constant |
|---|---|---|---|---|---|---|
| | | | | refractive index | dispersion coefficient | |
| OBJ | spherical | infinite | infinite | | | |
| S1 | aspheric | 1.9337 | 0.7068 | 1.55 | 56.1 | −0.2078 |
| S2 | aspheric | 8.7244 | 0.1109 | | | −66.1169 |
| STO | spherical | infinite | 0.0821 | | | |
| S3 | aspheric | 7.1480 | 0.3000 | 1.67 | 20.4 | −23.8912 |
| S4 | aspheric | 3.9524 | 0.3746 | | | −10.5345 |
| S5 | aspheric | −1000.0000 | 0.6342 | 1.55 | 56.1 | 99.0000 |
| S6 | aspheric | −6.2728 | 0.2284 | | | 17.7720 |

TABLE 7-continued

| surface number | surface form | radius of curvature | thickness | material refractive index | dispersion coefficient | conic constant |
|---|---|---|---|---|---|---|
| S7 | aspheric | −5.1971 | 0.3677 | 1.64 | 23.5 | 6.2544 |
| S8 | aspheric | −5.1645 | 0.2086 | | | −4.3623 |
| S9 | aspheric | 43.6703 | 0.8168 | 1.55 | 56.1 | 99.0000 |
| S10 | aspheric | −2.6279 | 0.2616 | | | −0.0776 |
| S11 | aspheric | −9.2743 | 0.4972 | 1.54 | 55.8 | 6.6312 |
| S12 | aspheric | 1.5483 | 0.5568 | | | −7.4181 |
| S13 | spherical | infinite | 0.2100 | 1.52 | 64.2 | |
| S14 | spherical | infinite | 0.2442 | | | |
| S15 | spherical | infinite | | | | |

TABLE 8

| Surface number | A4 | A6 | A8 | A10 | A12 |
|---|---|---|---|---|---|
| S1 | −6.8729E−03 | 6.0252E−02 | −2.0010E−01 | 4.1181E−01 | −5.3485E−01 |
| S2 | −7.4435E−03 | −3.3539E−02 | 1.6463E−01 | −4.2414E−01 | 6.7073E−01 |
| S3 | −5.1459E−02 | 1.1922E−01 | −4.5447E−01 | 1.3445E+00 | −2.4894E+00 |
| S4 | 8.6907E−03 | −7.3469E−02 | 5.3862E−01 | −1.6848E+00 | 3.2448E+00 |
| S5 | −4.2405E−02 | 2.7931E−02 | −1.8378E−01 | 5.2877E−01 | −1.0095E+00 |
| S6 | −4.4293E−02 | −5.1937E−02 | 8.8257E−02 | −1.1390E−01 | 8.9862E−02 |
| S7 | −1.5013E−02 | −1.6912E−01 | 3.3490E−01 | −4.2670E−01 | 4.0605E−01 |
| S8 | 8.2519E−02 | −3.8070E−01 | 5.1138E−01 | −4.2984E−01 | 2.6130E−01 |
| S9 | 1.9286E−01 | −3.4920E−01 | 2.7749E−01 | −1.5235E−01 | 5.9243E−02 |
| S10 | 2.9612E−01 | −1.9145E−01 | 3.2889E−02 | 2.6762E−02 | −2.1058E−02 |
| S11 | −4.9044E−03 | −5.3899E−02 | 4.5752E−02 | −2.8120E−02 | 1.1847E−02 |
| S12 | −7.0376E−02 | 3.1635E−02 | −1.4296E−02 | 4.7845E−03 | −1.0801E−03 |

| Surface number | A14 | A16 | A18 | A20 |
|---|---|---|---|---|
| S1 | 4.4019E−01 | −2.2333E−01 | 6.3788E−02 | −7.8952E−03 |
| S2 | −6.7157E−01 | 4.1265E−01 | −1.4203E−01 | 2.0918E−02 |
| S3 | 2.8723E+00 | −2.0127E+00 | 7.8507E−01 | −1.3095E−01 |
| S4 | −3.8934E+00 | 2.8299E+00 | −1.1329E+00 | 1.9125E−01 |
| S5 | 1.2332E+00 | −9.3137E−01 | 3.9358E−01 | −6.9486E−02 |
| S6 | −3.2608E−02 | −2.8566E−03 | 5.7769E−03 | −1.1607E−03 |
| S7 | −2.5986E−01 | 1.0378E−01 | −2.3319E−02 | 2.2378E−03 |
| S8 | −1.1252E−01 | 3.2176E−02 | −5.4079E−03 | 3.9769E−04 |
| S9 | −1.4867E−02 | 1.4149E−03 | 2.7256E−04 | −5.9095E−05 |
| S10 | 7.0222E−03 | −1.2669E−03 | 1.1968E−04 | −4.6385E−06 |
| S11 | −2.9628E−03 | 4.1912E−04 | −3.1047E−05 | 9.3529E−07 |
| S12 | 1.6256E−04 | −1.5783E−05 | 8.9029E−07 | −2.1908E−08 |

TABLE 9

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 4.39 | −13.78 | 11.56 | 235.64 | 4.57 | −2.43 | 4.48 | 37.23 |

Figure 6A:
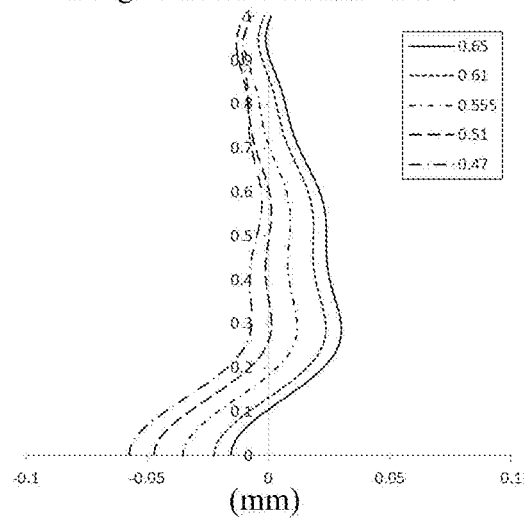
FIG. 6A shows a longitudinal aberration curve of the camera lens assembly according to Embodiment 3.
Figure 6B:
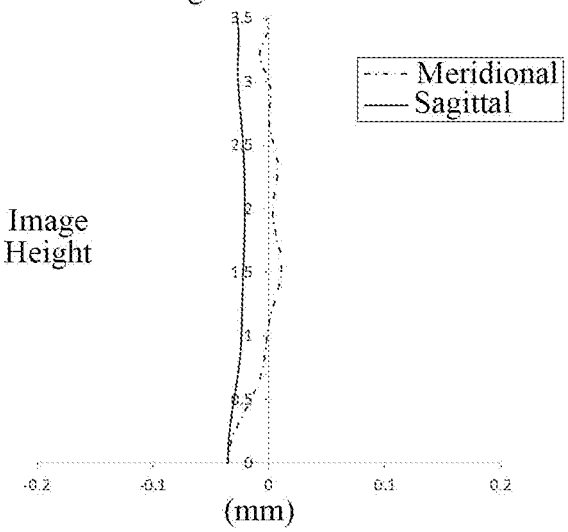
FIG. 6B shows an astigmatism curve of the camera lens assembly according to Embodiment 3.
Figure 6C:
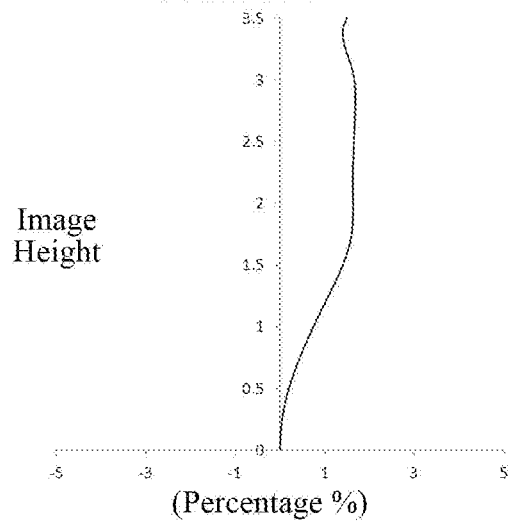
FIG. 6C shows a distortion curve of the camera lens assembly according to Embodiment 3.
Figure 6D:
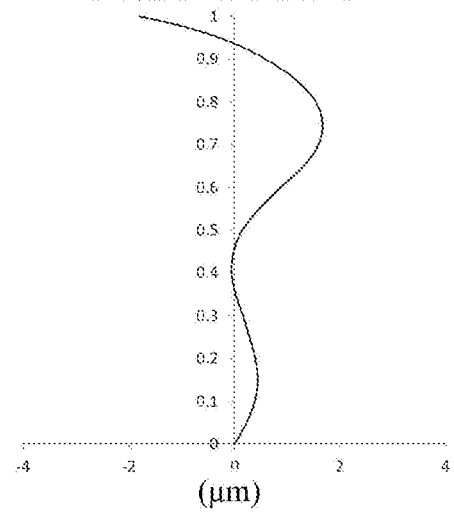
FIG. 6D shows a lateral color curve of the camera lens assembly according to Embodiment 3.

FIG. 6A shows a longitudinal aberration curve of the camera lens assembly according to Embodiment 3, representing deviations of focal points of light of different wavelengths converged after passing through a lens assembly. FIG. 6B shows an astigmatism curve of the camera lens assembly according to Embodiment 3, representing a curvature of a meridional image plane and a curvature of a sagittal image plane. FIG. 6C shows a distortion curve of the camera lens assembly according to Embodiment 3, representing amounts of distortion at different viewing angles. FIG. 6D shows a lateral color curve of the camera lens assembly according to Embodiment 3, representing deviations of different image heights on an image plane after light passes through the lens assembly. It can be seen from FIG. 6A to FIG. 6D that the camera lens assembly according to Embodiment 3 achieves good image quality.

Embodiment 4

Figure 7:
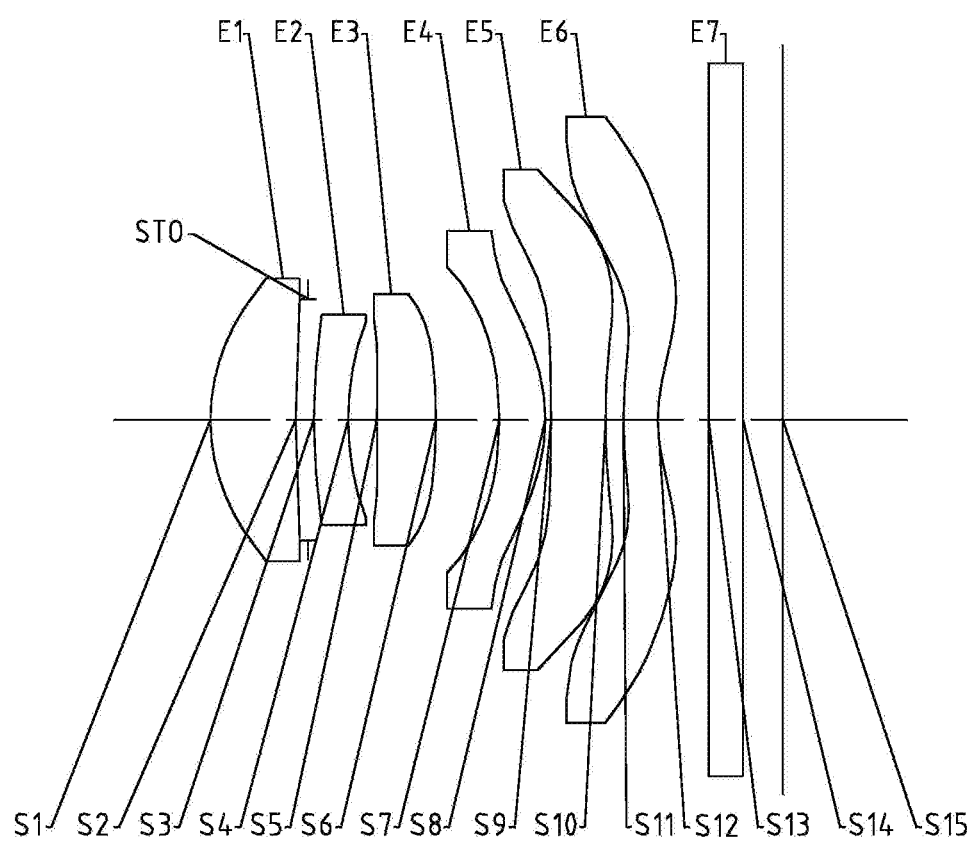
FIG. 7 is a schematic structural diagram illustrating a camera lens assembly according to Embodiment 4 of the present application.

The camera lens assembly according to Embodiment 4 of the present application is described below with reference to FIG. 7 to FIG. 8D. FIG. 7 is a schematic structural diagram illustrating a camera lens assembly according to Embodiment 4 of the present application.

As shown in FIG. 7, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 10 shows a surface form, a radius of curvature, a thickness, a material, and a conic constant of each lens of the camera lens assembly of Embodiment 4, wherein the unit for the radius of curvature and the thickness is millimeter (mm). Table 11 shows higher-order coefficients of the lens surfaces in Embodiment 4. Table 12 shows effective focal lengths of the lenses f1 to f6, a total effective focal length f of the camera lens assembly and a half field-of-view angle HFOV of the camera lens assembly of Embodiment 4. Here, the respective aspheric surface forms may be defined by the formula 1) given in the above embodiment.

TABLE 10

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 1.7146 | 0.7431 | 1.55 | 56.1 | 0.3939 |
| S2 | aspheric | 9.1181 | 0.1077 | | | −48.1247 |
| STO | spherical | infinite | 0.0500 | | | |
| S3 | aspheric | 4.7230 | 0.3000 | 1.67 | 20.4 | −29.1997 |
| S4 | aspheric | 2.3986 | 0.2503 | | | −12.9182 |
| S5 | aspheric | 16.3229 | 0.5143 | 1.55 | 56.1 | −90.5775 |
| S6 | aspheric | −6.2396 | 0.5542 | | | 27.8202 |
| S7 | aspheric | −2.8515 | 0.4000 | 1.64 | 23.5 | 0.0061 |
| S8 | aspheric | −1.6663 | 0.0500 | | | −1.0323 |
| S9 | aspheric | −19.2717 | 0.4755 | 1.64 | 23.5 | 90.9472 |
| S10 | aspheric | 14.7087 | 0.1547 | | | −99.0000 |
| S11 | aspheric | 3.7409 | 0.3000 | 1.54 | 55.8 | −75.4757 |
| S12 | aspheric | 1.4226 | 0.4431 | | | −6.3566 |
| S13 | spherical | infinite | 0.3000 | 1.52 | 64.2 | |
| S14 | spherical | infinite | 0.3471 | | | |
| S15 | spherical | infinite | | | | |

TABLE 11

| surface number | A4 | A6 | A8 | A10 | A12 |
|---|---|---|---|---|---|
| S1 | −1.9210E−02 | 2.8677E−02 | −1.1992E−01 | 2.4950E−01 | −3.4365E−01 |
| S2 | −2.7593E−02 | 8.9422E−03 | 9.5566E−02 | −3.3266E−01 | 5.9565E−01 |
| S3 | −5.4919E−02 | 1.1906E−01 | −2.9686E−01 | 9.8351E−01 | −2.2397E+00 |
| S4 | 6.7424E−02 | −1.4751E−01 | 1.0023E+00 | −4.0930E+00 | 1.1255E+01 |
| S5 | −5.5156E−02 | −9.3116E−02 | 6.6332E−01 | −3.5971E+00 | 1.1685E+01 |
| S6 | −2.4766E−02 | −1.7214E−01 | 7.4884E−01 | −2.3930E+00 | 4.8380E+00 |
| S7 | −9.5841E−03 | −2.6105E−01 | 1.1724E+00 | −2.7542E+00 | 3.7294E+00 |
| S8 | −1.9994E−02 | 1.0231E−01 | 2.1190E−02 | −3.5487E−01 | 5.0426E−01 |
| S9 | −8.3575E−03 | 9.4933E−02 | −3.0411E−01 | 3.4781E−01 | −2.2051E−01 |
| S10 | 2.4334E−01 | −4.5149E−01 | 4.0189E−01 | −2.3718E−01 | 9.4431E−02 |
| S11 | 1.1433E−01 | −3.2703E−01 | 2.2250E−01 | −7.1522E−02 | 1.0309E−02 |
| S12 | −8.3329E−02 | −3.7576E−03 | −3.8806E−03 | 1.3568E−02 | −7.5499E−03 |

| surface number | A14 | A16 | A18 | A20 |
|---|---|---|---|---|
| S1 | 3.0152E−01 | −1.6542E−01 | 5.1589E−02 | −7.1154E−03 |
| S2 | −6.5866E−01 | 4.4502E−01 | −1.6891E−01 | 2.7585E−02 |
| S3 | 3.1894E+00 | −2.7434E+00 | 1.3047E+00 | −2.6303E−01 |
| S4 | −2.0188E+01 | 2.2696E+01 | −1.4526E+01 | 4.0586E+00 |
| S5 | −2.3682E+01 | 2.9178E+01 | −1.9998E+01 | 5.8615E+00 |
| S6 | −6.2406E+00 | 4.9796E+00 | −2.2376E+00 | 4.3390E−01 |
| S7 | −3.0775E+00 | 1.5479E+00 | −4.3897E−01 | 5.3831E−02 |
| S8 | −3.2673E−01 | 1.1193E−01 | −1.9774E−02 | 1.4254E−03 |
| S9 | 8.4768E−02 | −1.9566E−02 | 2.4927E−03 | −1.3478E−04 |
| S10 | −2.4763E−02 | 4.0580E−03 | −3.7362E−04 | 1.4671E−05 |
| S11 | 1.6430E−04 | −2.7023E−04 | 3.4856E−05 | −1.5018E−06 |
| S12 | 2.0162E−03 | −2.9624E−04 | 2.3126E−05 | −7.5173E−07 |

TABLE 12

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.74 | −7.71 | 8.34 | 5.49 | −12.87 | −4.48 | 4.11 | 37.68 |

Figure 8A:
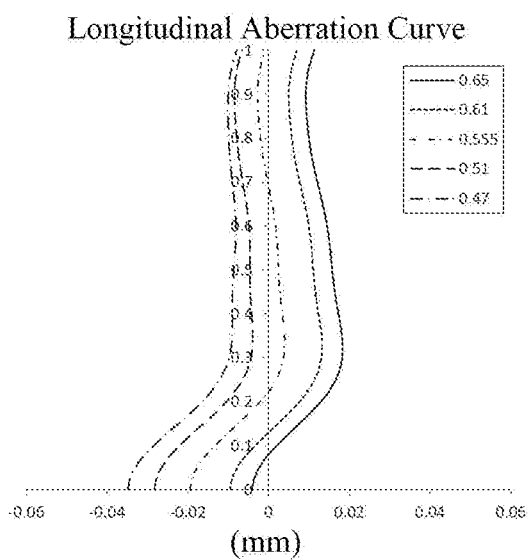
FIG. 8A shows a longitudinal aberration curve of the camera lens assembly according to Embodiment 4.
Figure 8B:
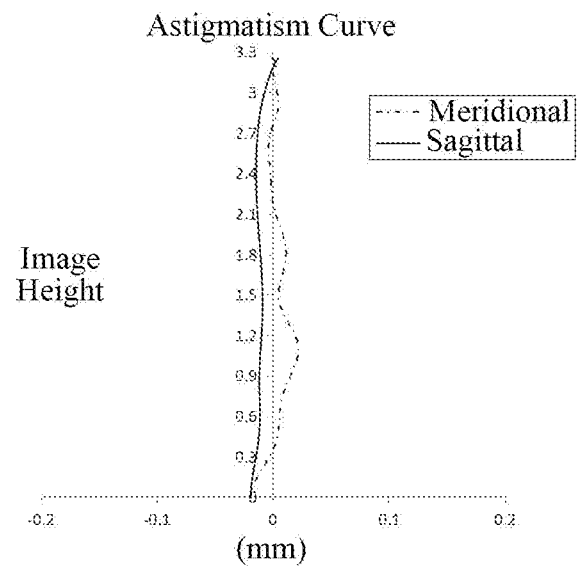
FIG. 8B shows an astigmatism curve of the camera lens assembly according to Embodiment 4.
Figure 8C:
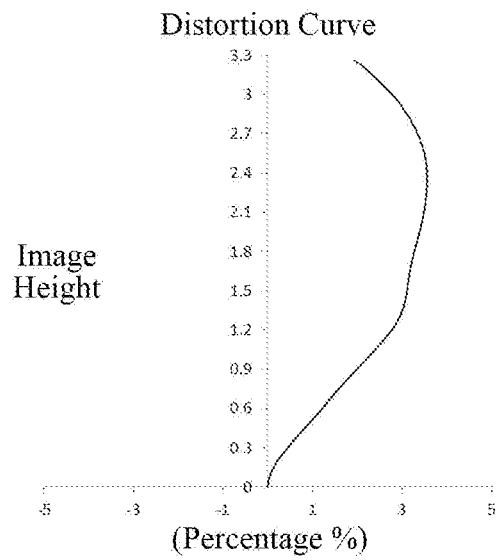
FIG. 8C shows a distortion curve of the camera lens assembly according to Embodiment 4.
Figure 8D:
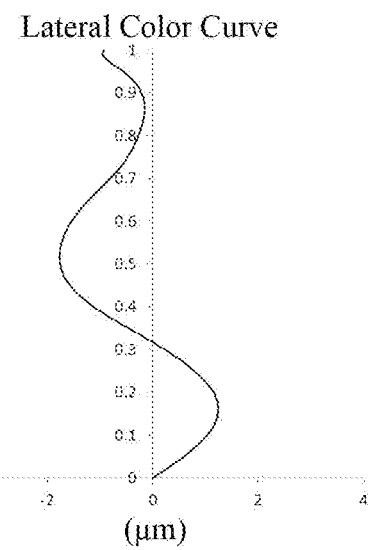
FIG. 8D shows a lateral color curve of the camera lens assembly according to Embodiment 4.

FIG. 8A shows a longitudinal aberration curve of the camera lens assembly according to Embodiment 4, representing deviations of focal points of light of different wavelengths converged after passing through a lens assembly. FIG. 8B shows an astigmatism curve of the camera lens assembly according to Embodiment 4, representing a curvature of a meridional image plane and a curvature of a sagittal image plane. FIG. 8C shows a distortion curve of the camera lens assembly according to Embodiment 4, representing amounts of distortion at different viewing angles. FIG. 8D shows a lateral color curve of the camera lens assembly according to Embodiment 4, representing deviations of different image heights on an image plane after light passes through the lens assembly. It can be seen from FIG. 8A to FIG. 8D that the camera lens assembly according to Embodiment 4 achieves good image quality.

Embodiment 5

Figure 9:
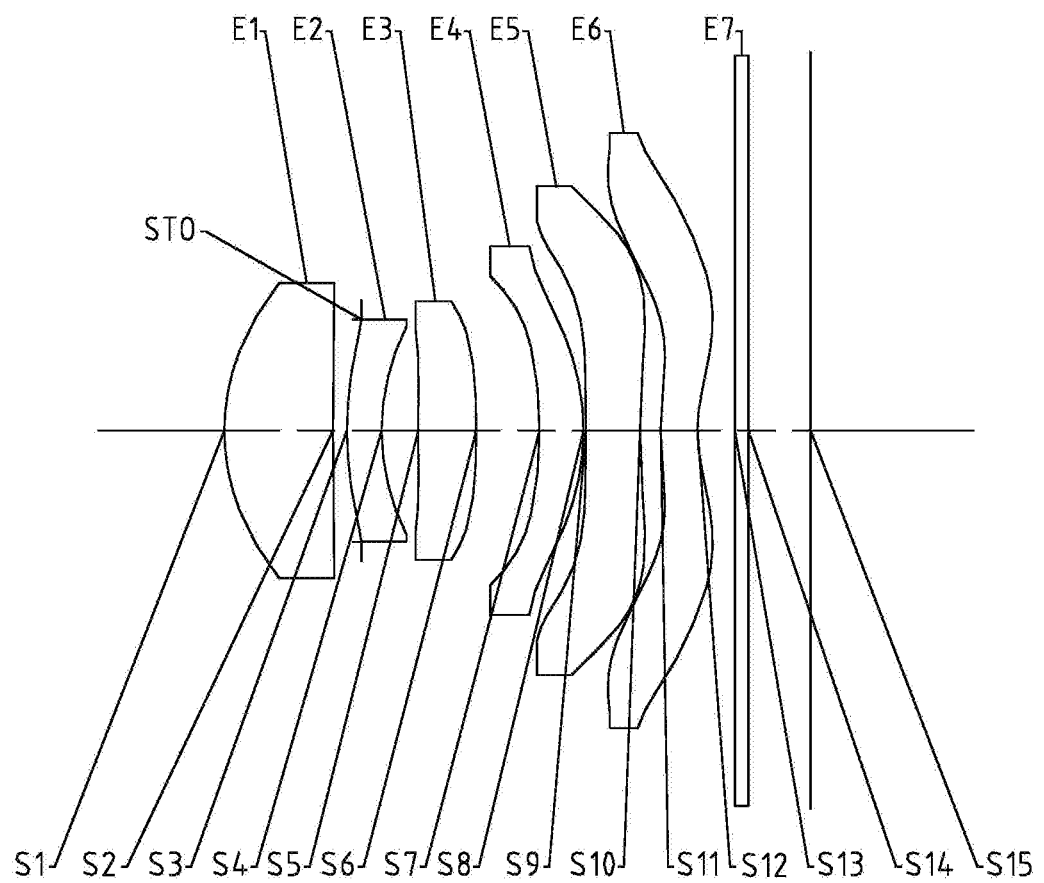
FIG. 9 is a schematic structural diagram illustrating a camera lens assembly according to Embodiment 5 of the present application.

The camera lens assembly according to Embodiment 5 of the present application is described below with reference to FIG. 9 to FIG. 10D. FIG. 9 is a schematic structural diagram illustrating a camera lens assembly according to Embodiment 5 of the present application.

As shown in FIG. 9, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 13 shows a surface form, a radius of curvature, a thickness, a material, and a conic constant of each lens of the camera lens assembly of Embodiment 5, wherein the unit for the radius of curvature and the thickness is millimeter (mm). Table 14 shows higher-order coefficients of the lens surfaces in Embodiment 5. Table 15 shows effective focal lengths of the lenses f1 to f6, a total effective focal length f of the camera lens assembly and a half field-of-view angle HFOV of the camera lens assembly of Embodiment 5. Here, the respective aspheric surface forms may be defined by the formula 1) given in the above embodiment.

TABLE 13

| surface number | surface form | radius of curvature | thickness | material refractive index | dispersion coefficient | conic constant |
|---|---|---|---|---|---|---|
| OBJ | spherical | infinite | infinite | | | |
| S1 | aspheric | 1.7275 | 0.8879 | 1.52 | 66.1 | 0.4287 |
| S2 | aspheric | 16.1575 | 0.2321 | | | −63.4440 |
| STO | spherical | infinite | −0.1180 | | | 0.0000 |
| S3 | aspheric | 2.7196 | 0.2826 | 1.67 | 20.4 | −18.5256 |
| S4 | aspheric | 1.7161 | 0.2996 | | | −9.3425 |
| S5 | aspheric | 23.7101 | 0.4745 | 1.55 | 56.1 | 67.0951 |
| S6 | aspheric | −6.9786 | 0.5161 | | | 41.4132 |
| S7 | aspheric | −3.9935 | 0.3600 | 1.64 | 23.5 | 3.1275 |
| S8 | aspheric | −1.9534 | 0.0200 | | | −0.5836 |
| S9 | aspheric | −17.1906 | 0.4416 | 1.64 | 23.5 | 96.6579 |
| S10 | aspheric | 7.5933 | 0.1683 | | | −92.0963 |
| S11 | aspheric | 2.1200 | 0.3000 | 1.54 | 55.8 | −24.0515 |
| S12 | aspheric | 1.1538 | 0.3068 | | | −7.5792 |
| S13 | spherical | infinite | 0.1110 | 1.52 | 64.2 | |
| S14 | spherical | infinite | 0.5075 | | | |
| S15 | spherical | infinite | | | | |

TABLE 14

| surface number | A4 | A6 | A8 | A10 | A12 |
|---|---|---|---|---|---|
| S1 | −2.4867E−02 | 4.1752E−02 | −1.7743E−01 | 3.8878E−01 | −5.5642E−01 |
| S2 | −6.9037E−02 | 1.6477E−01 | −3.0729E−01 | 4.6224E−01 | −5.4888E−01 |
| S3 | −2.8382E−02 | 1.4616E−01 | −4.4844E−01 | 1.4126E+00 | −3.2135E+00 |
| S4 | 1.4088E−01 | −3.8405E−01 | 2.3852E+00 | −1.0903E+01 | 3.3287E+01 |
| S5 | −7.1994E−02 | 1.9405E−01 | −1.8928E+00 | 9.2654E+00 | −2.7445E+01 |
| S6 | −3.0031E−02 | −2.0129E−01 | 1.0234E+00 | −3.7347E+00 | 8.5274E+00 |
| S7 | −6.6580E−02 | 9.6087E−02 | −1.1238E−01 | −4.1132E−02 | 3.1233E−02 |
| S8 | −2.3898E−02 | 1.2951E−01 | −2.2599E−01 | 1.8266E−01 | −5.5819E−02 |
| S9 | 6.9663E−02 | −2.2906E−01 | 1.7905E−01 | −7.1628E−02 | 3.1133E−02 |
| S10 | 1.3854E−01 | −3.5040E−01 | 3.5778E−01 | −2.3894E−01 | 1.0855E−01 |
| S11 | −2.3747E−01 | 7.5881E−02 | −7.7880E−03 | 6.9086E−03 | −6.3159E−03 |
| S12 | −1.9621E−01 | 9.0204E−02 | −2.8744E−02 | 4.0454E−03 | 1.2398E−03 |

| surface number | A14 | A16 | A18 | A20 |
|---|---|---|---|---|
| S1 | 5.0457E−01 | −2.8211E−01 | 8.8444E−02 | −1.1973E−02 |
| S2 | 4.6623E−01 | −2.5855E−01 | 8.1967E−02 | −1.1121E−02 |
| S3 | 4.7383E+00 | −4.2866E+00 | 2.1602E+00 | −4.6398E−01 |
| S4 | −6.5458E+01 | 7.9839E+01 | −5.5028E+01 | 1.6450E+01 |
| S5 | 4.9865E+01 | −5.4274E+01 | 3.2288E+01 | −7.9385E+00 |
| S6 | −1.2300E+01 | 1.0911E+01 | −5.4448E+00 | 1.1799E+00 |
| S7 | 1.9281E−01 | −2.8206E−01 | 1.5027E−01 | −2.8670E−02 |
| S8 | −6.3547E−03 | 9.0754E−03 | −2.3552E−03 | 2.0883E−04 |
| S9 | −2.7975E−02 | 1.6036E−02 | −4.1813E−03 | 4.0270E−04 |
| S10 | −3.3390E−02 | 6.6099E−03 | −7.4996E−04 | 3.6668E−05 |
| S11 | 2.4217E−03 | −4.7783E−04 | 4.8580E−05 | −2.0291E−06 |
| S12 | −6.7386E−04 | 1.1653E−04 | −8.1368E−06 | 1.5094E−07 |

TABLE 15

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.61 | −7.86 | 9.93 | 5.55 | −8.11 | −5.29 | 4.03 | 36.72 |

Figure 10A:
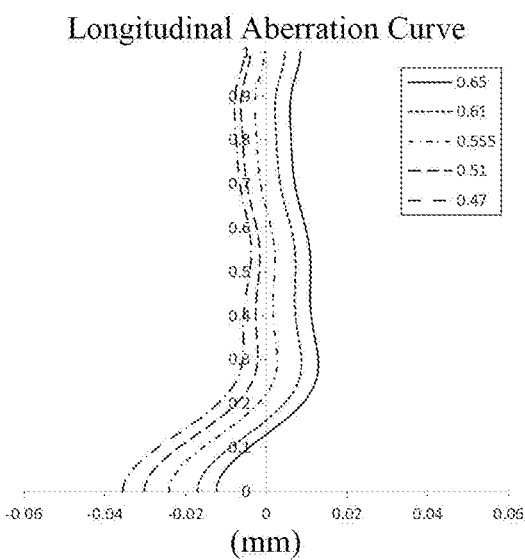
FIG. 10A shows a longitudinal aberration curve of the camera lens assembly according to Embodiment 5.
Figure 10B:
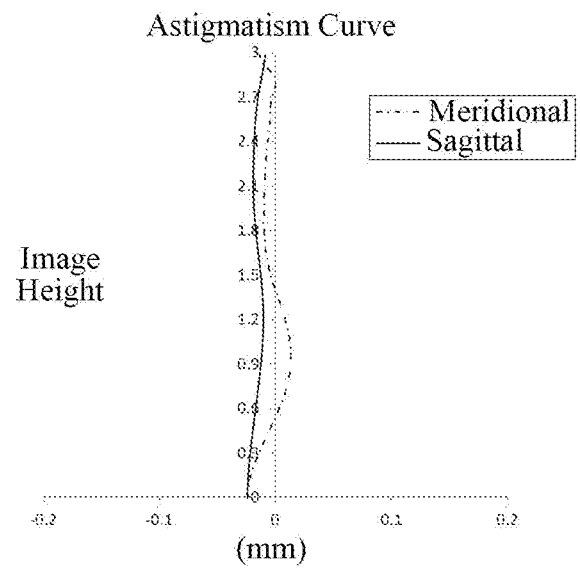
FIG. 10B shows an astigmatism curve of the camera lens assembly according to Embodiment 5.
Figure 10C:
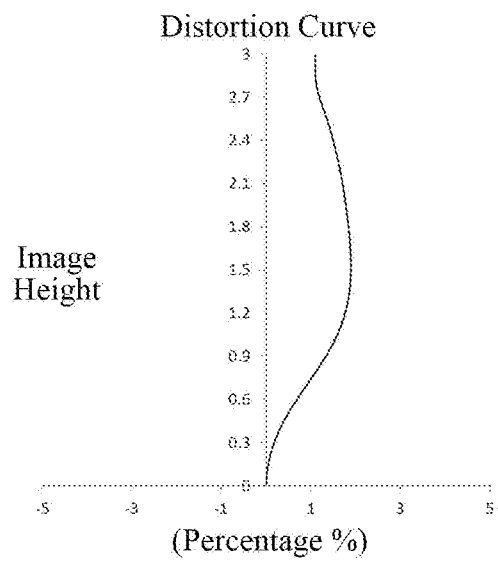
FIG. 10C shows a distortion curve of the camera lens assembly according to Embodiment 5.
Figure 10D:
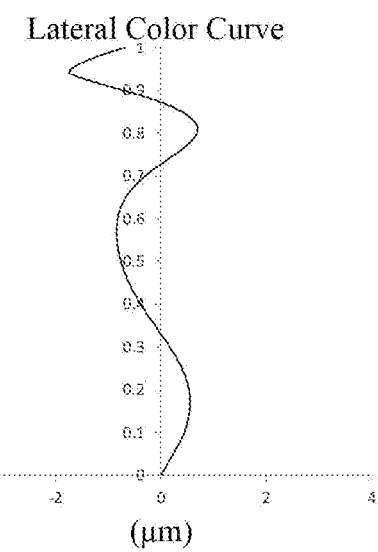
FIG. 10D shows a lateral color curve of the camera lens assembly according to Embodiment 5.

FIG. 10A shows a longitudinal aberration curve of the camera lens assembly according to Embodiment 5, representing deviations of focal points of light of different wavelengths converged after passing through a lens assembly. FIG. 10B shows an astigmatism curve of the camera lens assembly according to Embodiment 5, representing a curvature of a meridional image plane and a curvature of a sagittal image plane. FIG. 10C shows a distortion curve of the camera lens assembly according to Embodiment 5, representing amounts of distortion at different viewing angles. FIG. 10D shows a lateral color curve of the camera lens assembly according to Embodiment 5, representing deviations of different image heights on an image plane after light passes through the lens assembly. It can be seen from FIG. 10A to FIG. 10D that the camera lens assembly according to Embodiment 5 achieves good image quality.

Embodiment 6

Figure 11:
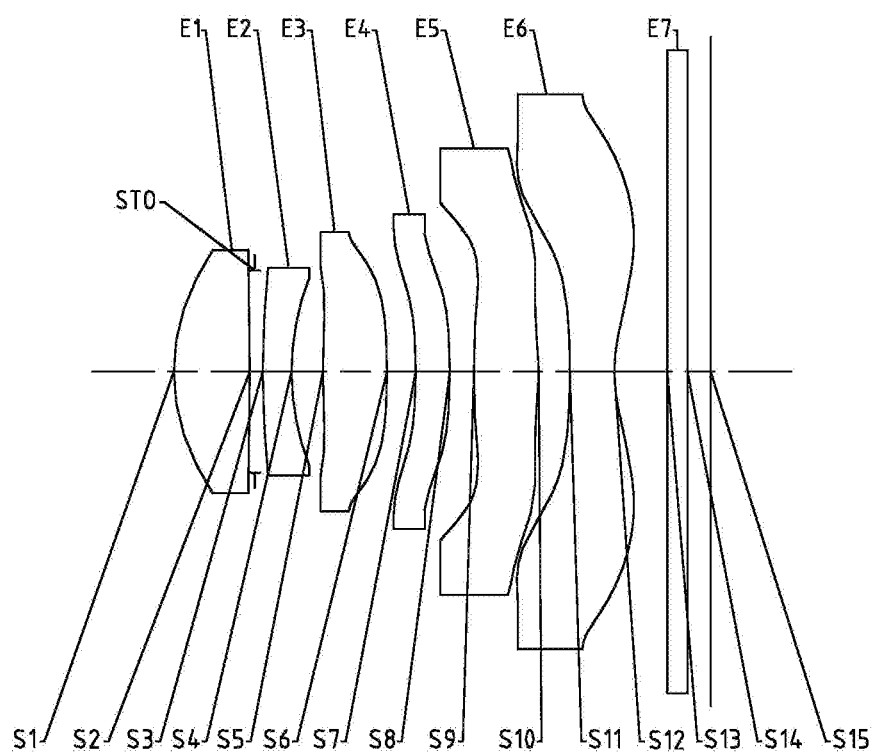
FIG. 11 is a schematic structural diagram illustrating a camera lens assembly according to Embodiment 6 of the present application.

The camera lens assembly according to Embodiment 6 of the present application is described below with reference to FIG. 11 to FIG. 12D. FIG. 11 is a schematic structural diagram illustrating a camera lens assembly according to Embodiment 6 of the present application.

As shown in FIG. 11, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 16 shows a surface form, a radius of curvature, a thickness, a material, and a conic constant of each lens of the camera lens assembly of Embodiment 6, wherein the unit for the radius of curvature and the thickness is millimeter (mm). Table 17 shows higher-order coefficients of the lens surfaces in Embodiment 6. Table 18 shows effective focal lengths of the lenses f1 to f6, a total effective focal length f of the camera lens assembly and a half field-of-view angle HFOV of the camera lens assembly of Embodiment 6. Here, the respective aspheric surface forms may be defined by the formula 1) given in the above embodiment.

TABLE 16

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 2.0895 | 0.7927 | 1.55 | 56.1 | −0.3349 |
| S2 | aspheric | −146.8713 | 0.0532 | | | 99.0000 |
| STO | spherical | infinite | 0.0822 | | | 0.0000 |
| S3 | aspheric | 7.2428 | 0.3000 | 1.67 | 20.4 | −17.2804 |
| S4 | aspheric | 2.4116 | 0.3277 | | | −9.2037 |
| S5 | aspheric | 8.2234 | 0.6684 | 1.55 | 56.1 | −99.0000 |
| S6 | aspheric | −8.0756 | 0.3004 | | | 21.0511 |
| S7 | aspheric | −5.8076 | 0.3554 | 1.64 | 23.5 | 2.8771 |
| S8 | aspheric | −5.6085 | 0.2504 | | | −4.0857 |
| S9 | aspheric | 21.4955 | 0.6768 | 1.55 | 56.1 | 51.5007 |
| S10 | aspheric | −2.7604 | 0.3245 | | | −0.1020 |
| S11 | aspheric | −9.3483 | 0.4634 | 1.54 | 55.8 | 3.4074 |
| S12 | aspheric | 1.6036 | 0.5537 | | | −7.2977 |
| S13 | spherical | infinite | 0.2100 | 1.52 | 64.2 | |
| S14 | spherical | infinite | 0.2412 | | | |
| S15 | spherical | infinite | | | | |

TABLE 17

| surface number | A4 | A6 | A8 | A10 | A12 |
|---|---|---|---|---|---|
| S1 | −1.1707E−03 | 1.3844E−02 | −3.7298E−02 | 5.9721E−02 | −6.1889E−02 |
| S2 | −2.5939E−02 | 3.5498E−02 | 6.2362E−02 | −3.4577E−01 | 6.8090E−01 |
| S3 | −9.4998E−02 | 2.0055E−01 | −3.4930E−01 | 6.3279E−01 | −9.7493E−01 |
| S4 | −1.0348E−02 | 7.1847E−02 | −1.9119E−02 | −7.8222E−02 | 2.5952E−02 |
| S5 | −4.6184E−02 | 9.3309E−02 | −5.6682E−01 | 1.7203E+00 | −3.3108E+00 |
| S6 | −4.2356E−02 | −5.3171E−02 | 3.5871E−02 | 3.3178E−02 | −1.3597E−01 |
| S7 | −7.3573E−03 | −1.6350E−01 | 2.9715E−01 | −3.4381E−01 | 2.7966E−01 |
| S8 | 6.4397E−02 | −3.4712E−01 | 4.9750E−01 | −4.5334E−01 | 2.9574E−01 |
| S9 | 1.9010E−01 | −3.2659E−01 | 2.7804E−01 | −1.9992E−01 | 1.1750E−01 |
| S10 | 2.9236E−01 | −1.6097E−01 | −1.8502E−02 | 6.7171E−02 | −3.9106E−02 |
| S11 | −8.2726E−03 | −4.2913E−02 | 2.9800E−02 | −1.6275E−02 | 6.9451E−03 |
| S12 | −7.0547E−02 | 3.4410E−02 | −1.8827E−02 | 7.6333E−03 | −2.0827E−03 |

| surface number | A14 | A16 | A18 | A20 |
|---|---|---|---|---|
| S1 | 4.0041E−02 | −1.5924E−02 | 3.5755E−03 | −3.6689E−04 |
| S2 | −7.6231E−01 | 5.0335E−01 | −1.8238E−01 | 2.7941E−02 |
| S3 | 1.0603E+00 | −7.2883E−01 | 2.8211E−01 | −4.6903E−02 |
| S4 | 2.7294E−01 | −4.7660E−01 | 3.2749E−01 | −8.3288E−02 |
| S5 | 4.0093E+00 | −2.9634E+00 | 1.2197E+00 | −2.1182E−01 |
| S6 | 1.6918E−01 | −1.0476E−01 | 3.2661E−02 | −4.0376E−03 |
| S7 | −1.3903E−01 | 3.8616E−02 | −5.2235E−03 | 2.2404E−04 |
| S8 | −1.3205E−01 | 3.7933E−02 | −6.3060E−03 | 4.5885E−04 |
| S9 | −4.8644E−02 | 1.2201E−02 | −1.5708E−03 | 7.3903E−05 |
| S10 | 1.1893E−02 | −2.0553E−03 | 1.9029E−04 | −7.3325E−06 |
| S11 | −1.7772E−03 | 2.5246E−04 | −1.8433E−05 | 5.3773E−07 |
| S12 | 3.7169E−04 | −4.1368E−05 | 2.5856E−06 | −6.8765E−08 |

TABLE 18

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.78 | −5.56 | 7.57 | 149.32 | 4.53 | −2.51 | 4.46 | 37.39 |

Figure 12A:
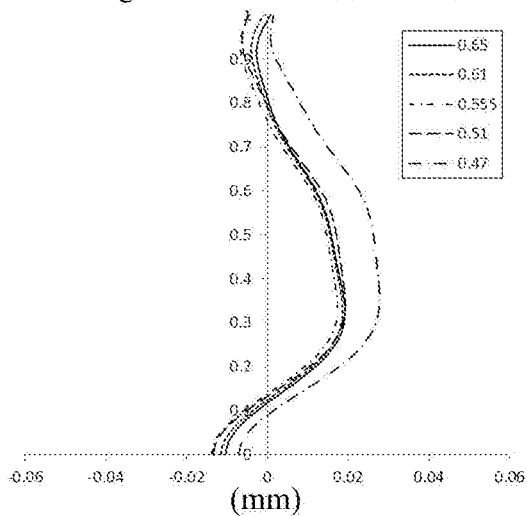
FIG. 12A shows a longitudinal aberration curve of the camera lens assembly according to Embodiment 6.
Figure 12B:
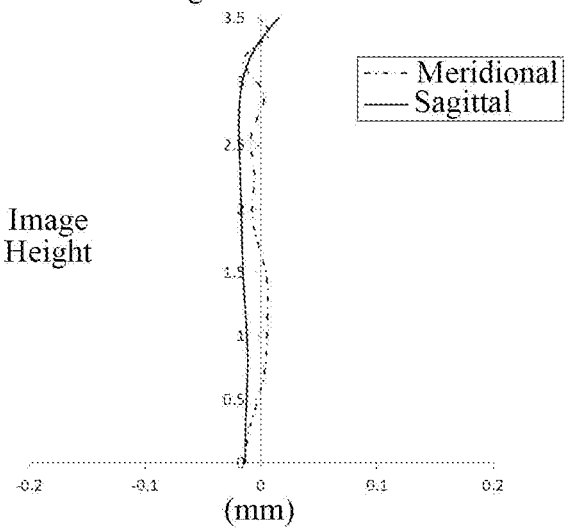
FIG. 12B shows an astigmatism curve of the camera lens assembly according to Embodiment 6.
Figure 12C:
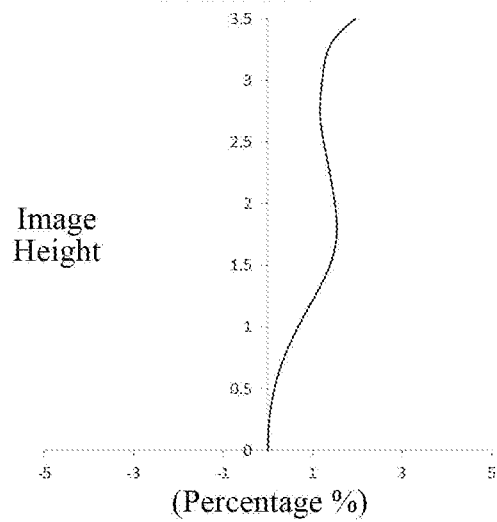
FIG. 12C shows a distortion curve of the camera lens assembly according to Embodiment 6.
Figure 12D:
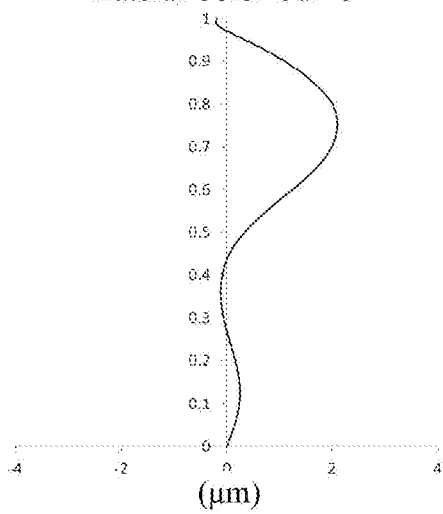
FIG. 12D shows a lateral color curve of the camera lens assembly according to Embodiment 6.

FIG. 12A shows a longitudinal aberration curve of the camera lens assembly according to Embodiment 6, representing deviations of focal points of light of different wavelengths converged after passing through a lens assembly. FIG. 12B shows an astigmatism curve of the camera lens assembly according to Embodiment 6, representing a curvature of a meridional image plane and a curvature of a sagittal image plane. FIG. 12C shows a distortion curve of the camera lens assembly according to Embodiment 6, representing amounts of distortion at different viewing angles. FIG. 12D shows a lateral color curve of the camera lens assembly according to Embodiment 6, representing deviations of different image heights on an image plane after light passes through the lens assembly. It can be seen from FIG. 12A to FIG. 12D that the camera lens assembly according to Embodiment 6 achieves good image quality.

Embodiment 7

Figure 13:
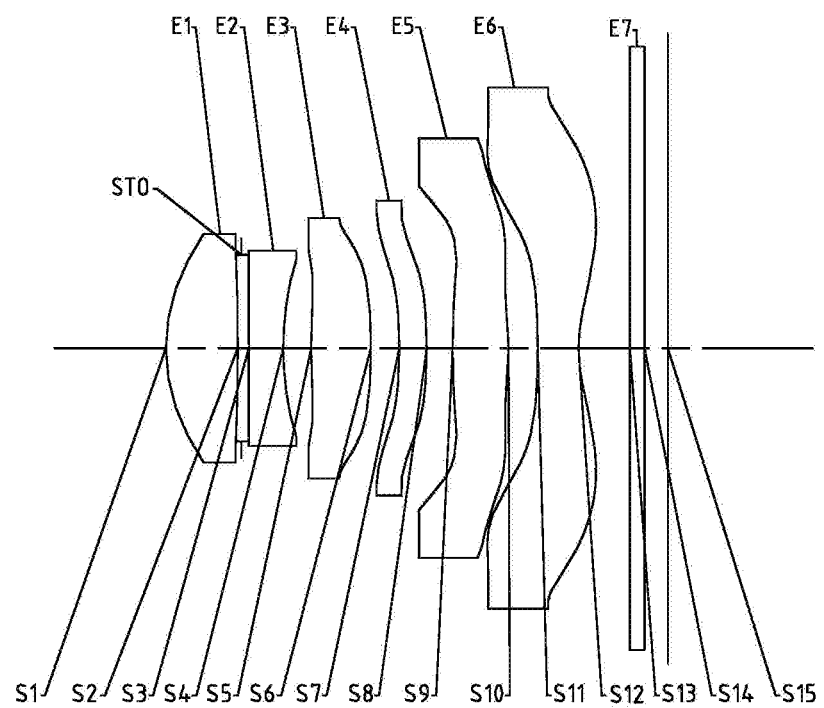
FIG. 13 is a schematic structural diagram illustrating a camera lens assembly according to Embodiment 7 of the present application.

The camera lens assembly according to Embodiment 7 of the present application is described below with reference to FIG. 13 to FIG. 14D. FIG. 13 is a schematic structural diagram illustrating a camera lens assembly according to Embodiment 7 of the present application.

As shown in FIG. 13, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 19 shows a surface form, a radius of curvature, a thickness, a material, and a conic constant of each lens of the camera lens assembly of Embodiment 7, wherein the unit for the radius of curvature and the thickness is millimeter (mm). Table 20 shows higher-order coefficients of the lens surfaces in Embodiment 7. Table 21 shows effective focal lengths of the lenses f1 to f6, a total effective focal length f of the camera lens assembly and a half field-of-view angle HFOV of the camera lens assembly of Embodiment 7. Here, the respective aspheric surface forms may be defined by the formula 1) given in the above embodiment.

TABLE 19

| surface number | surface form | radius of curvature | thickness | material refractive index | dispersion coefficient | conic constant |
|---|---|---|---|---|---|---|
| OBJ | spherical | infinite | infinite | | | |
| S1 | aspheric | 2.0191 | 0.8024 | 1.55 | 56.1 | −0.3319 |
| S2 | aspheric | −43.3772 | 0.0398 | | | 59.2884 |
| STO | spherical | infinite | 0.0832 | | | 0.0000 |
| S3 | aspheric | −1000.0000 | 0.3842 | 1.67 | 20.4 | −99.0000 |
| S4 | aspheric | 3.3009 | 0.3115 | | | −11.7749 |
| S5 | aspheric | 7.0529 | 0.6661 | 1.55 | 56.1 | −99.0000 |
| S6 | aspheric | −8.7988 | 0.3178 | | | 14.1781 |
| S7 | aspheric | −5.2874 | 0.3055 | 1.64 | 23.5 | 2.5185 |
| S8 | aspheric | −5.3071 | 0.2893 | | | −2.7013 |
| S9 | aspheric | 25.3921 | 0.6236 | 1.55 | 56.1 | 60.2274 |
| S10 | aspheric | −2.7560 | 0.3254 | | | −0.0718 |
| S11 | aspheric | −8.9925 | 0.4552 | 1.54 | 55.8 | 2.7977 |
| S12 | aspheric | 1.6560 | 0.5727 | | | −7.3388 |
| S13 | spherical | infinite | 0.1633 | 1.52 | 64.2 | |
| S14 | spherical | infinite | 0.2601 | | | |
| S15 | spherical | infinite | | | | |

TABLE 20

| surface number | A4 | A6 | A8 | A10 | A12 |
|---|---|---|---|---|---|
| S1 | −2.7020E−03 | 2.9739E−02 | −9.8232E−02 | 1.9891E−01 | −2.5615E−01 |
| S2 | −2.3962E−02 | 4.0791E−02 | 1.1801E−02 | −1.8065E−01 | 3.7916E−01 |
| S3 | −6.4692E−02 | 2.0401E−01 | −5.6994E−01 | 1.5119E+00 | −2.8900E+00 |
| S4 | −1.0968E−02 | 3.9982E−02 | 1.3073E−01 | −5.5551E−01 | 1.0200E+00 |
| S5 | −4.9755E−02 | 9.7584E−02 | −5.9448E−01 | 1.7615E+00 | −3.3175E+00 |
| S6 | −3.6725E−02 | −7.8520E−02 | 1.2325E−01 | −1.5191E−01 | 1.0725E−01 |
| S7 | 3.3698E−03 | −1.8934E−01 | 3.3029E−01 | −3.7511E−01 | 3.0790E−01 |
| S8 | 6.6743E−02 | −3.8348E−01 | 5.9535E−01 | −5.9949E−01 | 4.2999E−01 |
| S9 | 1.8262E−01 | −2.9686E−01 | 2.3054E−01 | −1.5384E−01 | 8.8384E−02 |
| S10 | 2.9708E−01 | −1.6805E−01 | −1.4810E−02 | 6.7188E−02 | −3.9899E−02 |
| S11 | −3.3770E−03 | −5.8494E−02 | 4.7324E−02 | −2.7111E−02 | 1.1023E−02 |
| S12 | −7.0098E−02 | 3.1811E−02 | −1.6932E−02 | 7.0112E−03 | −2.0120E−03 |

| surface number | A14 | A16 | A18 | A20 |
|---|---|---|---|---|
| S1 | 2.0746E−01 | −1.0317E−01 | 2.8713E−02 | −3.4522E−03 |
| S2 | −4.3476E−01 | 2.9241E−01 | −1.0798E−01 | 1.6886E−02 |
| S3 | 3.5745E+00 | −2.6984E+00 | 1.1292E+00 | −2.0063E−01 |

TABLE 20-continued

| | | | | |
|---|---|---|---|---|
| S4 | −1.0422E+00 | 5.8315E−01 | −1.4444E−01 | 5.6899E−03 |
| S5 | 3.9555E+00 | −2.8972E+00 | 1.1899E+00 | −2.0761E−01 |
| S6 | −3.0062E−02 | −6.7544E−03 | 6.4660E−03 | −1.1324E−03 |
| S7 | −1.6048E−01 | 4.9023E−02 | −7.9074E−03 | 5.0224E−04 |
| S8 | −2.0784E−01 | 6.3425E−02 | −1.0988E−02 | 8.2023E−04 |
| S9 | −3.6734E−02 | 9.2378E−03 | −1.1782E−03 | 5.3893E−05 |
| S10 | 1.2252E−02 | −2.1314E−03 | 1.9844E−04 | −7.6889E−06 |
| S11 | −2.7268E−03 | 3.8566E−04 | −2.8730E−05 | 8.7442E−07 |
| S12 | 3.8128E−04 | −4.4941E−05 | 2.9543E−06 | −8.2060E−08 |

TABLE 21

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.56 | −4.94 | 7.28 | 435.28 | 4.59 | −2.57 | 4.48 | 37.21 |

Figure 14A:
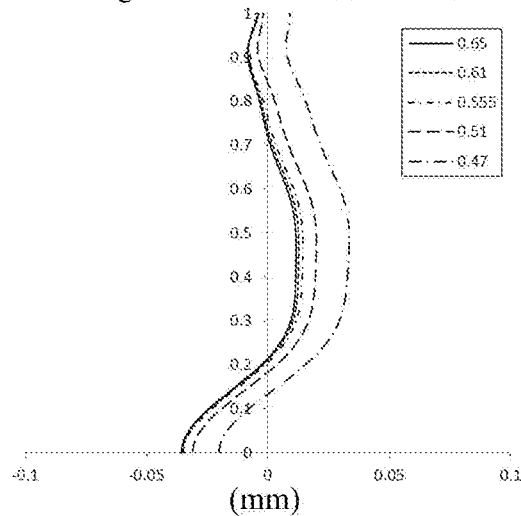
FIG. 14A shows a longitudinal aberration curve of the camera lens assembly according to Embodiment 7.
Figure 14B:
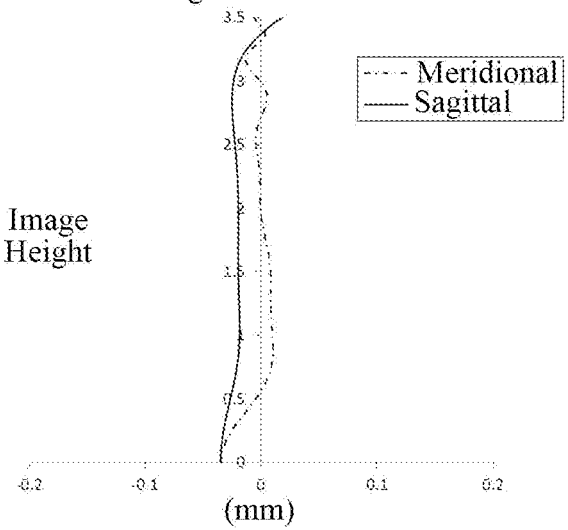
FIG. 14B shows an astigmatism curve of the camera lens assembly according to Embodiment 7.
Figure 14C:
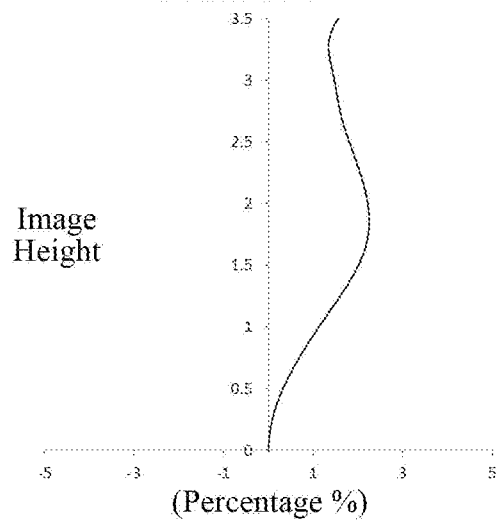
FIG. 14C shows a distortion curve of the camera lens assembly according to Embodiment 7.
Figure 14D:
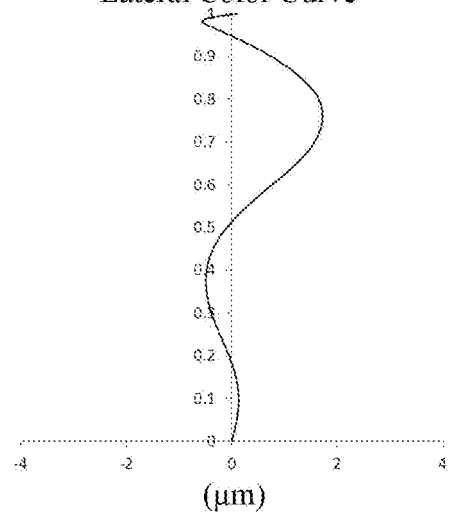
FIG. 14D shows a lateral color curve of the camera lens assembly according to Embodiment 7.

FIG. 14A shows a longitudinal aberration curve of the camera lens assembly according to Embodiment 7, representing deviations of focal points of light of different wavelengths converged after passing through a lens assembly. FIG. 14B shows an astigmatism curve of the camera lens assembly according to Embodiment 7, representing a curvature of a meridional image plane and a curvature of a sagittal image plane. FIG. 14C shows a distortion curve of the camera lens assembly according to Embodiment 7, representing amounts of distortion at different viewing angles. FIG. 14D shows a lateral color curve of the camera lens assembly according to Embodiment 7, representing deviations of different image heights on an image plane after light passes through the lens assembly. It can be seen from FIG. 14A to FIG. 14D that the camera lens assembly according to Embodiment 7 achieves good image quality.

Embodiment 8

Figure 15:
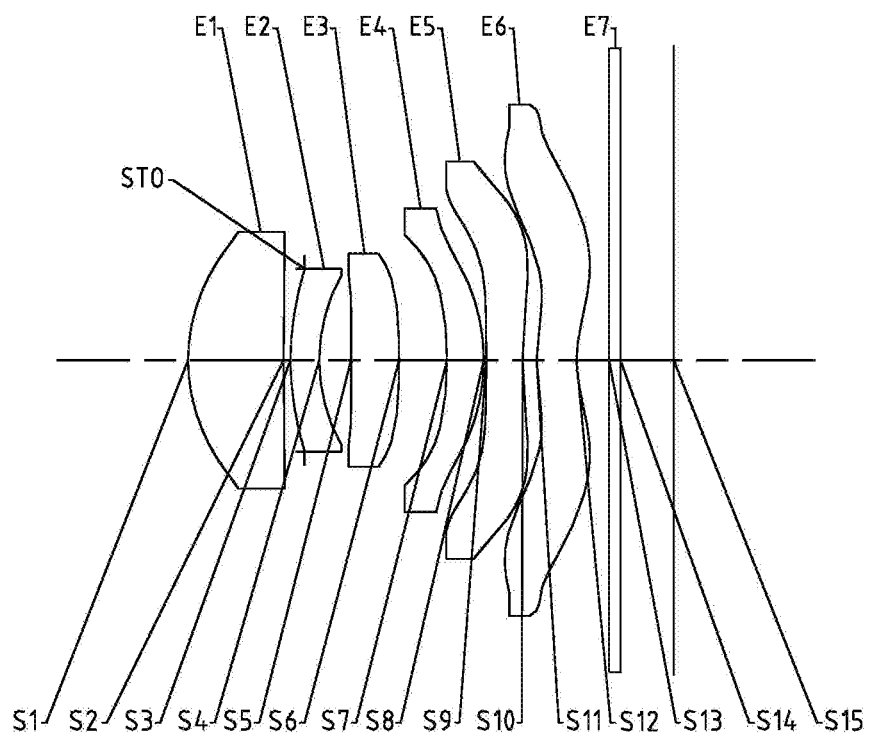
FIG. 15 is a schematic structural diagram illustrating a camera lens assembly according to Embodiment 8 of the present application.

The camera lens assembly according to Embodiment 8 of the present application is described below with reference to FIG. 15 to FIG. 16D. FIG. 15 is a schematic structural diagram illustrating a camera lens assembly according to Embodiment 8 of the present application.

As shown in FIG. 15, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 22 shows a surface form, a radius of curvature, a thickness, a material, and a conic constant of each lens of the camera lens assembly of Embodiment 8, wherein the unit for the radius of curvature and the thickness is millimeter (mm). Table 23 shows higher-order coefficients of the lens surfaces in Embodiment 8. Table 24 shows effective focal lengths of the lenses f1 to f6, a total effective focal length f of the camera lens assembly and a half field-of-view angle HFOV of the camera lens assembly of Embodiment 8. Here, the respective aspheric surface forms may be defined by the formula 1) given in the above embodiment.

TABLE 22

| surface number | surface form | radius of curvature | thickness | material | | conic constant |
|---|---|---|---|---|---|---|
| | | | | refractive index | dispersion coefficient | |
| OBJ | spherical | infinite | infinite | | | |
| S1 | aspheric | 1.7124 | 0.9347 | 1.53 | 70.4 | 0.4561 |
| S2 | aspheric | 11.3211 | 0.2025 | | | −96.0687 |
| STO | spherical | infinite | −0.1367 | | | 0.0000 |
| S3 | aspheric | 2.3157 | 0.2826 | 1.67 | 20.4 | −14.8650 |
| S4 | aspheric | 1.5974 | 0.3109 | | | −8.3355 |
| S5 | aspheric | 22.8747 | 0.4700 | 1.55 | 56.1 | 56.0143 |
| S6 | aspheric | −8.3186 | 0.4691 | | | 55.8177 |
| S7 | aspheric | −3.9542 | 0.3600 | 1.64 | 23.5 | 7.3543 |
| S8 | aspheric | −1.9467 | 0.0251 | | | −0.3274 |
| S9 | aspheric | −16.8446 | 0.3540 | 1.64 | 23.5 | 98.9979 |
| S10 | aspheric | 3.4379 | 0.1375 | | | −99.0000 |
| S11 | aspheric | 1.4486 | 0.3900 | 1.54 | 55.8 | −13.4854 |
| S12 | aspheric | 1.1319 | 0.3196 | | | −5.9359 |
| S13 | spherical | infinite | 0.1110 | 1.52 | 64.2 | |
| S14 | spherical | infinite | 0.5199 | | | |
| S15 | spherical | infinite | | | | |

TABLE 23

| surface number | A4 | A6 | A8 | A10 | A12 |
|---|---|---|---|---|---|
| S1 | −2.3406E−02 | 3.0275E−02 | −1.6237E−01 | 3.8992E−01 | −5.9436E−01 |
| S2 | −1.5912E−01 | 5.7464E−01 | −1.5296E+00 | 3.1076E+00 | −4.6363E+00 |
| S3 | −7.1479E−02 | 4.3593E−01 | −1.3585E+00 | 3.5272E+00 | −6.7790E+00 |
| S4 | 1.5499E−01 | −3.3996E−01 | 2.3634E+00 | −1.2255E+01 | 4.1838E+01 |
| S5 | −7.0959E−02 | 1.5748E−01 | −1.6218E+00 | 8.3683E+00 | −2.6465E+01 |
| S6 | −5.2375E−02 | −3.6838E−02 | 5.4237E−02 | −3.4164E−01 | 9.6971E−01 |
| S7 | −7.4673E−02 | 9.3477E−02 | −1.5016E−01 | 2.1163E−01 | −6.8242E−01 |
| S8 | −4.0758E−02 | 1.3412E−01 | −9.9287E−02 | −3.0091E−01 | 6.5979E−01 |
| S9 | 3.9922E−02 | −7.4990E−02 | −4.0820E−02 | −3.4513E−02 | 1.9455E−01 |

TABLE 23-continued

| | | | | | |
|---|---|---|---|---|---|
| S10 | 2.9934E−02 | −5.6267E−02 | −3.4496E−02 | 7.3673E−02 | −5.3945E−02 |
| S11 | −3.8325E−01 | 3.1513E−01 | −2.0079E−01 | 9.9344E−02 | −3.3906E−02 |
| S12 | −2.7290E−01 | 2.2790E−01 | −1.6343E−01 | 8.3573E−02 | −2.7849E−02 |

| surface number | A14 | A16 | A18 | A20 |
|---|---|---|---|---|
| S1 | 5.6057E−01 | −3.2082E−01 | 1.0176E−01 | −1.3825E−02 |
| S2 | 4.7884E+00 | −3.2039E+00 | 1.2413E+00 | −2.1061E−01 |
| S3 | 8.8402E+00 | −7.2574E+00 | 3.3520E+00 | −6.5878E−01 |
| S4 | −9.0548E+01 | 1.2009E+02 | −8.9155E+01 | 2.8475E+01 |
| S5 | 5.1857E+01 | −6.1460E+01 | 4.0211E+01 | −1.1017E+01 |
| S6 | −1.6035E+00 | 1.5719E+00 | −8.6192E−01 | 2.1174E−01 |
| S7 | 1.2484E+00 | −1.1287E+00 | 5.0257E−01 | −8.8337E−02 |
| S8 | −5.4309E−01 | 2.2830E−01 | −4.9015E−02 | 4.2642E−03 |
| S9 | −1.9301E−01 | 8.7631E−02 | −1.9373E−02 | 1.6905E−03 |
| S10 | 2.2662E−02 | −5.7167E−03 | 8.0371E−04 | 4.8220E−05 |
| S11 | 7.5805E−03 | −1.0619E−03 | 8.4845E−05 | −2.9623E−06 |
| S12 | 5.8891E−03 | −7.6586E−04 | 5.6404E−05 | −1.8204E−06 |

TABLE 24

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.71 | −9.16 | 11.23 | 5.56 | −4.40 | −16.92 | 4.01 | 36.80 |

Figure 16A:
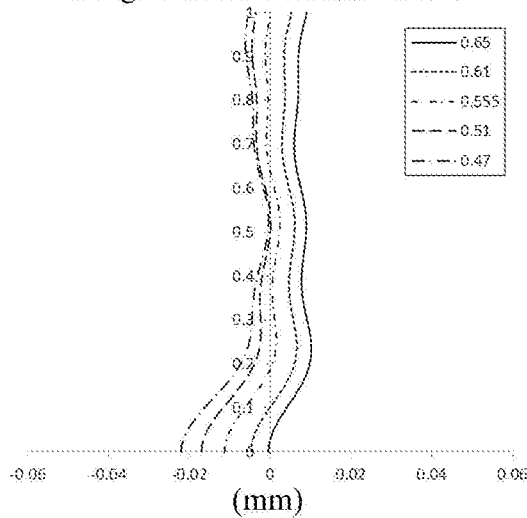
FIG. 16A shows a longitudinal aberration curve of the camera lens assembly according to Embodiment 8.
Figure 16B:
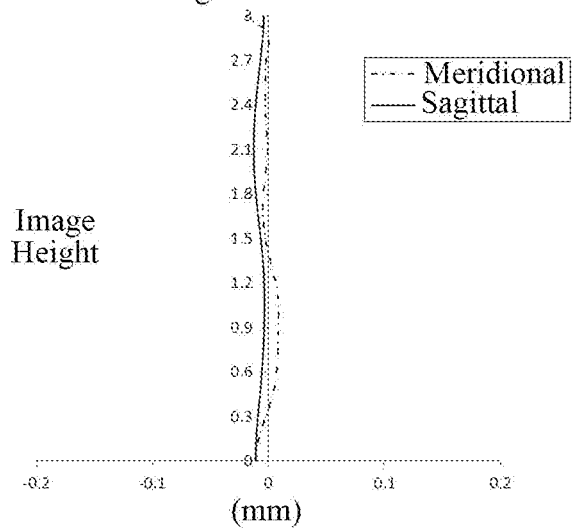
FIG. 16B shows an astigmatism curve of the camera lens assembly according to Embodiment 8.
Figure 16C:
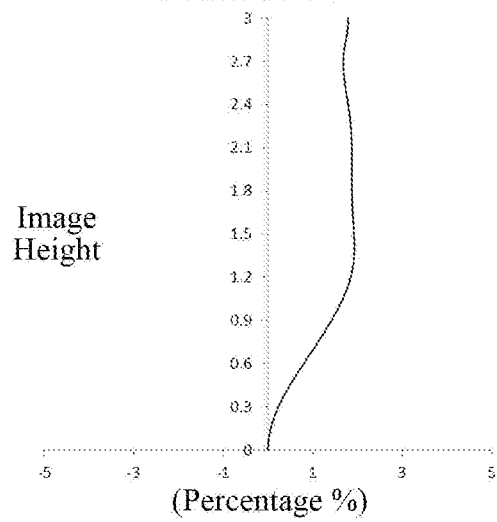
FIG. 16C shows a distortion curve of the camera lens assembly according to Embodiment 8.
Figure 16D:
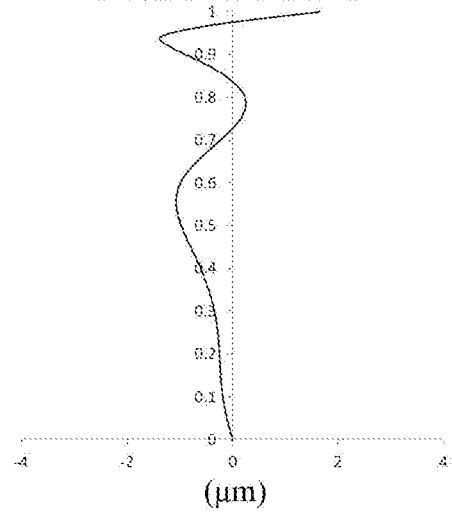
FIG. 16D shows a lateral color curve of the camera lens assembly according to Embodiment 8.

FIG. 16A shows a longitudinal aberration curve of the camera lens assembly according to Embodiment 8, representing deviations of focal points of light of different wavelengths converged after passing through a lens assembly. FIG. 16B shows an astigmatism curve of the camera lens assembly according to Embodiment 8, representing a curvature of a meridional image plane and a curvature of a sagittal image plane. FIG. 16C shows a distortion curve of the camera lens assembly according to Embodiment 8, representing amounts of distortion at different viewing angles. FIG. 16D shows a lateral color curve of the camera lens assembly according to Embodiment 8, representing deviations of different image heights on an image plane after light passes through the camera lens assembly. It can be seen from FIG. 16A to FIG. 16D that the camera lens assembly according to Embodiment 8 achieves good image quality.

Embodiment 9

Figure 17:
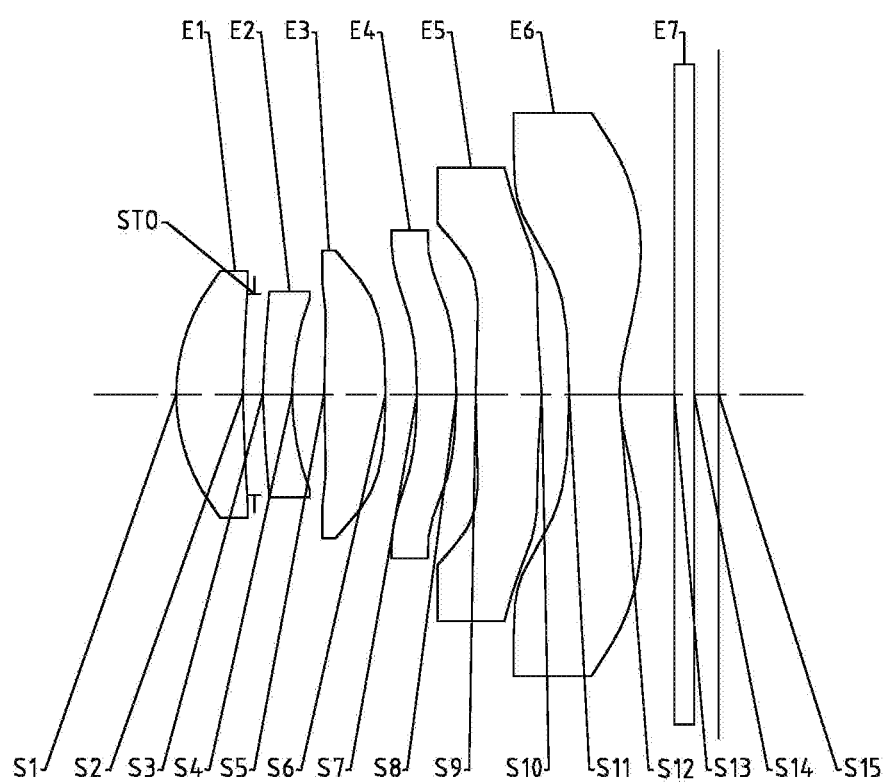
FIG. 17 is a schematic structural diagram illustrating a camera lens assembly according to Embodiment 9 of the present application.

The camera lens assembly according to Embodiment 9 of the present application is described below with reference to FIG. 17 to FIG. 18D. FIG. 17 is a schematic structural diagram illustrating a camera lens assembly according to Embodiment 9 of the present application.

As shown in FIG. 17, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 25 shows a surface form, a radius of curvature, a thickness, a material, and a conic constant of each lens of the camera lens assembly of Embodiment 9, wherein the unit for the radius of curvature and the thickness is millimeter (mm). Table 26 shows higher-order coefficients of the lens surfaces in Embodiment 9. Table 27 shows effective focal lengths of the lenses f1 to f6, a total effective focal length f of the camera lens assembly and a half field-of-view angle HFOV of the camera lens assembly of Embodiment 9. Here, the respective aspheric surface forms may be defined by the formula 1) given in the above embodiment.

TABLE 25

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 1.9715 | 0.6861 | 1.55 | 56.1 | −0.2163 |
| S2 | aspheric | 7.7050 | 0.1195 | | | −74.1046 |
| STO | spherical | infinite | 0.0855 | | | 0.0000 |
| S3 | aspheric | 4.4752 | 0.3009 | 1.67 | 20.4 | −35.0137 |
| S4 | aspheric | 2.4829 | 0.3297 | | | −9.2776 |
| S5 | aspheric | 8.4331 | 0.6326 | 1.55 | 56.1 | −98.2075 |
| S6 | aspheric | −7.1544 | 0.3246 | | | 22.2167 |
| S7 | aspheric | −5.2599 | 0.4055 | 1.64 | 23.5 | 3.0504 |
| S8 | aspheric | −4.5820 | 0.1986 | | | −5.9390 |
| S9 | aspheric | −120.4878 | 0.6789 | 1.55 | 56.1 | 99.0000 |
| S10 | aspheric | −2.6869 | 0.2830 | | | −0.1141 |
| S11 | aspheric | −10.2182 | 0.5163 | 1.54 | 55.8 | 6.9811 |
| S12 | aspheric | 1.5779 | 0.5653 | | | −6.7677 |
| S13 | spherical | infinite | 0.2048 | 1.52 | 64.2 | |
| S14 | spherical | infinite | 0.2527 | | | |
| S15 | spherical | infinite | | | | |

TABLE 26

| surface number | A4 | A6 | A8 | A10 | A12 |
|---|---|---|---|---|---|
| S1 | −2.2499E−03 | 2.3637E−02 | −7.2862E−02 | 1.4439E−01 | −1.8192E−01 |
| S2 | −2.0504E−02 | 2.0295E−02 | −8.1027E−03 | −2.2935E−02 | 7.4811E−02 |
| S3 | −5.0039E−02 | −2.1600E−02 | 3.5039E−01 | −1.1584E+00 | 2.3559E+00 |
| S4 | 1.9336E−03 | −6.3606E−03 | 1.6968E−01 | −4.0783E−01 | 5.7614E−01 |
| S5 | −3.4585E−02 | 6.0877E−02 | −3.2909E−01 | 8.4208E−01 | −1.4326E+00 |
| S6 | −3.9900E−02 | −7.3110E−02 | 1.1401E−01 | −1.3555E−01 | 8.2399E−02 |
| S7 | −2.6026E−02 | −9.5914E−02 | 1.7892E−01 | −2.4535E−01 | 2.5711E−01 |
| S8 | 6.4887E−02 | −3.2349E−01 | 4.6157E−01 | −4.4359E−01 | 3.1547E−01 |
| S9 | 1.8508E−01 | −2.8771E−01 | 1.8238E−01 | −7.6521E−02 | 2.4788E−02 |
| S10 | 2.9858E−01 | −1.9213E−01 | 2.5324E−02 | 3.6128E−02 | −2.6293E−02 |
| S11 | 1.3044E−03 | −6.6097E−02 | 5.8308E−02 | −3.4123E−02 | 1.3213E−02 |
| S12 | −7.1001E−02 | 3.0759E−02 | −1.1825E−02 | 3.2122E−03 | −5.9502E−04 |

| surface number | A14 | A16 | A18 | A20 |
|---|---|---|---|---|
| S1 | 1.4567E−01 | −7.2302E−02 | 2.0366E−02 | −2.5206E−03 |
| S2 | −1.1531E−01 | 9.7755E−02 | −4.3473E−02 | 7.8799E−03 |
| S3 | −3.0518E+00 | 2.4203E+00 | −1.0664E+00 | 1.9942E−01 |
| S4 | −4.6960E−01 | 1.7776E−01 | 6.6143E−03 | −1.7841E−02 |
| S5 | 1.6068E+00 | −1.1442E+00 | 4.6664E−01 | −8.1249E−02 |
| S6 | −1.3235E−04 | −2.8724E−02 | 1.4480E−02 | −2.2478E−03 |
| S7 | −1.6220E−01 | 5.8236E−02 | −1.1071E−02 | 8.6229E−04 |
| S8 | −1.5325E−01 | 4.6988E−02 | −8.1420E−03 | 6.0459E−04 |
| S9 | −6.2867E−03 | 5.9919E−04 | 1.8479E−04 | −3.9361E−05 |
| S10 | 8.6567E−03 | −1.5605E−03 | 1.4807E−04 | −5.7848E−06 |
| S11 | −3.0874E−03 | 4.1573E−04 | −2.9708E−05 | 8.7164E−07 |
| S12 | 7.6585E−05 | −6.8076E−06 | 3.7672E−07 | −9.4866E−09 |

TABLE 27

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 4.66 | −8.91 | 7.19 | 44.68 | 5.02 | −2.51 | 4.44 | 37.75 |

Figure 18A:
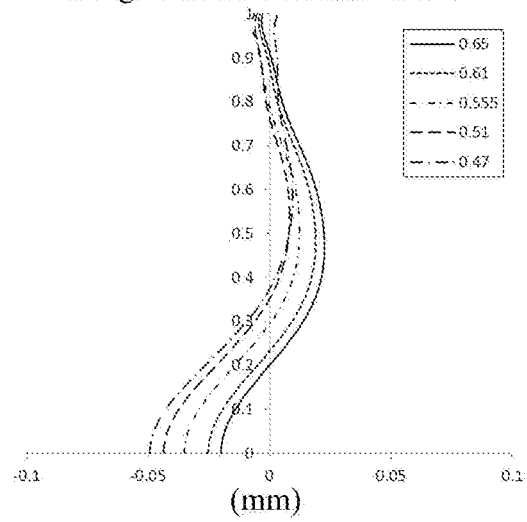
FIG. 18A shows a longitudinal aberration curve of the camera lens assembly according to Embodiment 9.
Figure 18B:
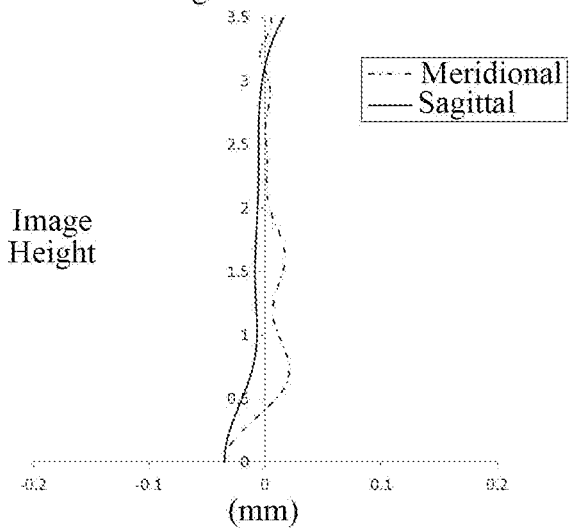
FIG. 18B shows an astigmatism curve of the camera lens assembly according to Embodiment 9.
Figure 18C:
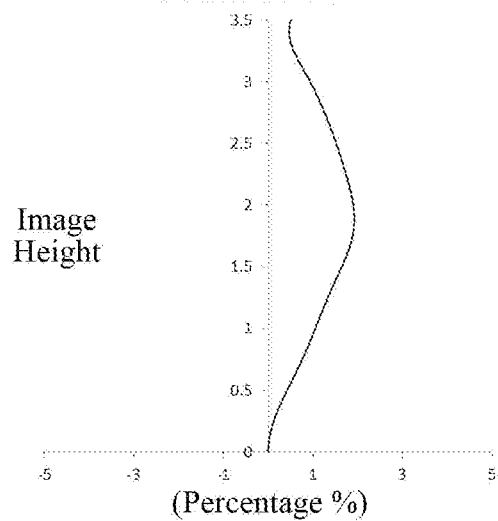
FIG. 18C shows a distortion curve of the camera lens assembly according to Embodiment 9.
Figure 18D:
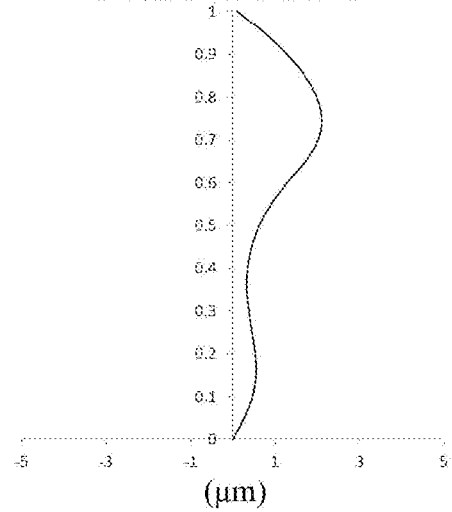
FIG. 18D shows a lateral color curve of the camera lens assembly according to Embodiment 9.

FIG. 18A shows a longitudinal aberration curve of the camera lens assembly according to Embodiment 9, representing deviations of focal points of light of different wavelengths converged after passing through a lens assembly. FIG. 18B shows an astigmatism curve of the camera lens assembly according to Embodiment 9, representing a curvature of a meridional image plane and a curvature of a sagittal image plane. FIG. 18C shows a distortion curve of the camera lens assembly according to Embodiment 9, representing amounts of distortion at different viewing angles. FIG. 18D shows a lateral color curve of the camera lens assembly according to Embodiment 9, representing deviations of different image heights on an image plane after light passes through the lens assembly. It can be seen from FIG. 18A to FIG. 18D that the camera lens assembly according to Embodiment 9 achieves good image quality.

Embodiment 10

Figure 19:
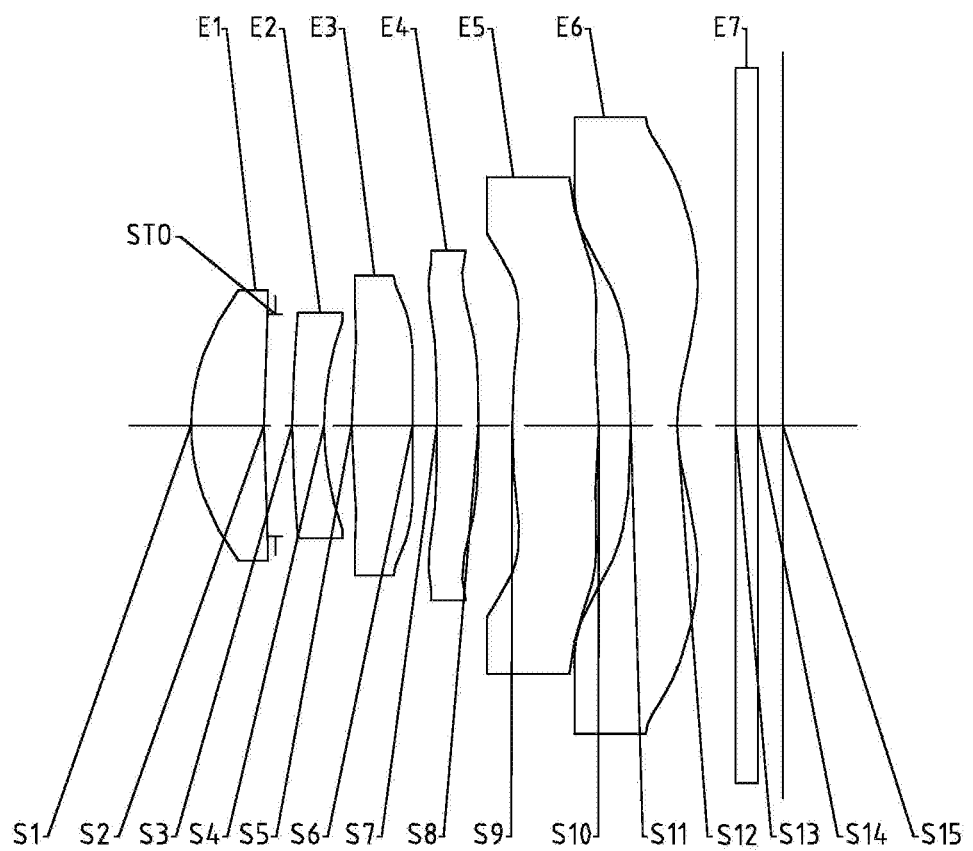
FIG. 19 is a schematic structural diagram illustrating a camera lens assembly according to Embodiment 10 of the present application.

The camera lens assembly according to Embodiment 10 of the present application is described below with reference to FIG. 19 to FIG. 20D. FIG. 19 is a schematic structural diagram illustrating a camera lens assembly according to Embodiment 10 of the present application.

As shown in FIG. 19, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 28 shows a surface form, a radius of curvature, a thickness, a material, and a conic constant of each lens of the camera lens assembly of Embodiment 10, wherein the unit for the radius of curvature and the thickness is millimeter (mm). Table 29 shows higher-order coefficients of the lens surfaces in Embodiment 10. Table 30 shows effective focal lengths of the lenses f1 to f6, a total effective focal length f of the camera lens assembly and a half field-of-view angle HFOV of the camera lens assembly of Embodiment 10. Here, the respective aspheric surface forms may be defined by the formula 1) given in the above embodiment.

TABLE 28

| | | | | material | | |
|---|---|---|---|---|---|---|
| surface number | surface form | radius of curvature | thickness | refractive index | dispersion coefficient | conic constant |
| OBJ | spherical | infinite | infinite | | | |
| S1 | aspheric | 1.9723 | 0.6856 | 1.55 | 56.1 | −0.2601 |
| S2 | aspheric | 10.8909 | 0.1079 | | | −57.5465 |
| STO | spherical | infinite | 0.1580 | | | 0.0000 |
| S3 | aspheric | 6.1771 | 0.3000 | 1.67 | 20.4 | −34.0964 |
| S4 | aspheric | 2.5359 | 0.2600 | | | −10.0268 |
| S5 | aspheric | 4.8757 | 0.5742 | 1.55 | 56.1 | −45.0165 |
| S6 | aspheric | 16.5699 | 0.2276 | | | 62.3958 |

TABLE 28-continued

| surface number | surface form | radius of curvature | thickness | material refractive index | material dispersion coefficient | conic constant |
|---|---|---|---|---|---|---|
| S7 | aspheric | 1643.0281 | 0.3925 | 1.64 | 23.5 | 99.0000 |
| S8 | aspheric | −13.3760 | 0.3179 | | | −15.8475 |
| S9 | aspheric | 9.4221 | 0.8150 | 1.55 | 56.1 | 21.7821 |
| S10 | aspheric | −2.9684 | 0.3008 | | | −0.0206 |
| S11 | aspheric | −10.6600 | 0.4373 | 1.54 | 55.8 | 6.0255 |
| S12 | aspheric | 1.5536 | 0.5484 | | | −8.0381 |
| S13 | spherical | infinite | 0.2100 | 1.52 | 64.2 | |
| S14 | spherical | infinite | 0.2358 | | | |
| S15 | spherical | infinite | | | | |

TABLE 29

| surface number | A4 | A6 | A8 | A10 | A12 |
|---|---|---|---|---|---|
| S1 | −3.7412E−03 | 3.4853E−02 | −1.1678E−01 | 2.4307E−01 | −3.1841E−01 |
| S2 | −1.2865E−02 | −1.5824E−02 | 1.3732E−01 | −3.8798E−01 | 6.2895E−01 |
| S3 | −7.4713E−02 | 1.6537E−01 | −4.8940E−01 | 1.4030E+00 | −2.7386E+00 |
| S4 | −1.1546E−02 | 6.5385E−02 | −3.1883E−02 | −8.3896E−02 | 3.3116E−01 |
| S5 | −2.9656E−02 | 1.1943E−01 | −6.3626E−01 | 1.7334E+00 | −3.0219E+00 |
| S6 | −4.9076E−02 | −5.2601E−02 | 9.0186E−02 | −1.3394E−01 | 1.1717E−01 |
| S7 | −4.6243E−03 | −1.9389E−01 | 3.6082E−01 | −4.1016E−01 | 3.2087E−01 |
| S8 | 7.0414E−02 | −3.9587E−01 | 6.2907E−01 | −6.4572E−01 | 4.6472E−01 |
| S9 | 1.5327E−01 | −2.6444E−01 | 1.8770E−01 | −9.8759E−02 | 3.9442E−02 |
| S10 | 2.9469E−01 | −1.8768E−01 | 2.8501E−02 | 2.7285E−02 | −2.0081E−02 |
| S11 | −9.8491E−03 | −4.3737E−02 | 3.4355E−02 | −1.9863E−02 | 8.1789E−03 |
| S12 | −7.0603E−02 | 3.1916E−02 | −1.6949E−02 | 6.7231E−03 | −1.7194E−03 |

| surface number | A14 | A16 | A18 | A20 |
|---|---|---|---|---|
| S1 | 2.6311E−01 | −1.3387E−01 | 3.8350E−02 | −4.7736E−03 |
| S2 | −6.3348E−01 | 3.8894E−01 | −1.3345E−01 | 1.9591E−02 |
| S3 | 3.3810E+00 | −2.5361E+00 | 1.0561E+00 | −1.8749E−01 |
| S4 | −5.7350E−01 | 5.5043E−01 | −2.7585E−01 | 5.6612E−02 |
| S5 | 3.3615E+00 | −2.3135E+00 | 8.9852E−01 | −1.4916E−01 |
| S6 | −6.0422E−02 | 1.8099E−02 | −2.4252E−03 | 5.4893E−05 |
| S7 | −1.6043E−01 | 4.8339E−02 | −8.0043E−03 | 5.5847E−04 |
| S8 | −2.2112E−01 | 6.5240E−02 | −1.0777E−02 | 7.6015E−04 |
| S9 | −1.0221E−02 | 1.0568E−03 | 1.2997E−04 | −2.9673E−05 |
| S10 | 6.5028E−03 | −1.1536E−03 | 1.0789E−04 | −4.1568E−06 |
| S11 | −1.9828E−03 | 2.6590E−04 | −1.8152E−05 | 4.8443E−07 |
| S12 | 2.8078E−04 | −2.8602E−05 | 1.6565E−06 | −4.1385E−08 |

TABLE 30

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 4.29 | −6.68 | 12.44 | 20.59 | 4.23 | −2.49 | 4.46 | 37.25 |

Figure 20A:
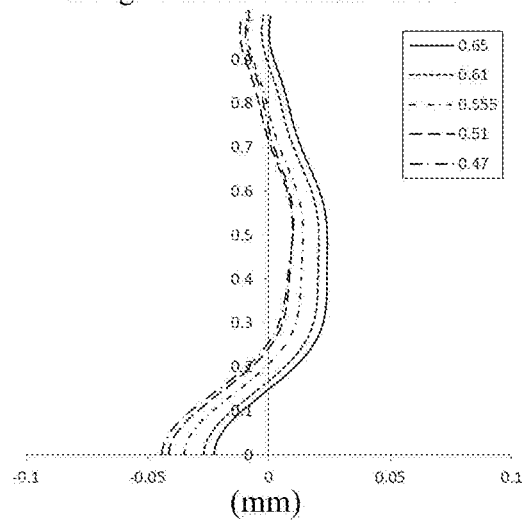
FIG. 20A shows a longitudinal aberration curve of the camera lens assembly according to Embodiment 10.
Figure 20B:
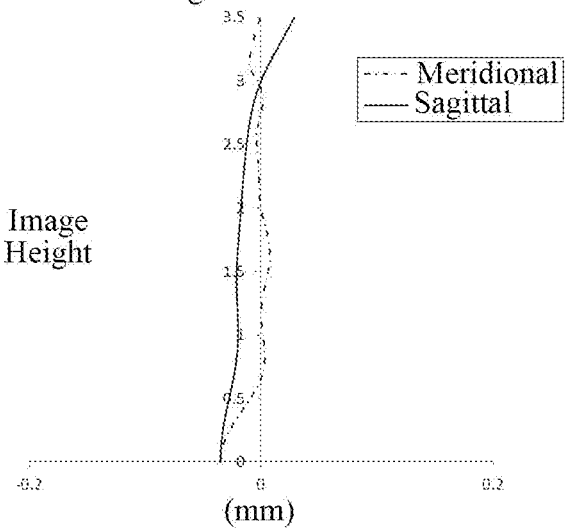
FIG. 20B shows an astigmatism curve of the camera lens assembly according to Embodiment 10.
Figure 20C:
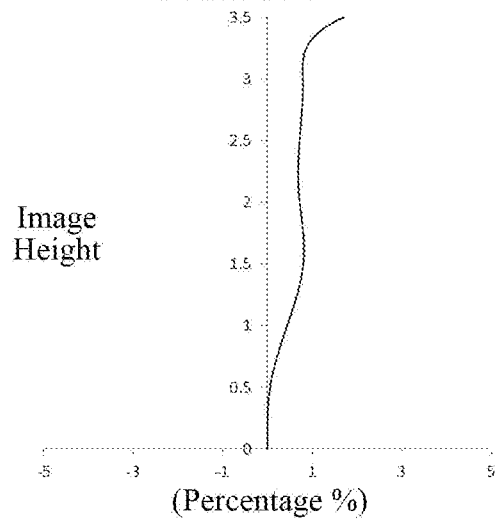
FIG. 20C shows a distortion curve of the camera lens assembly according to Embodiment 10.
Figure 20D:
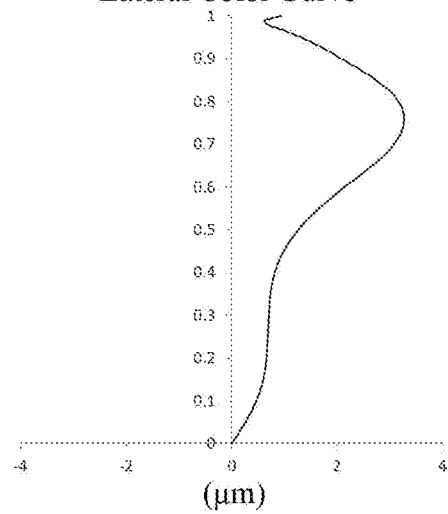
FIG. 20D shows a lateral color curve of the camera lens assembly according to Embodiment 10.

FIG. 20A shows a longitudinal aberration curve of the optical imaging system according to Embodiment 10, representing deviations of focal points of light of different wavelengths converged after passing through an optical system. FIG. 20B shows an astigmatism curve of the optical imaging system according to Embodiment 10, representing a curvature of a meridional image plane and a curvature of a sagittal image plane. FIG. 20C shows a distortion curve of the optical imaging system according to Embodiment 10, representing amounts of distortion at different viewing angles. FIG. 20D shows a lateral color curve of the optical imaging system according to Embodiment 10, representing deviations of different image heights on an image plane after light passes through the optical imaging system. It can be seen from FIG. 20A to FIG. 20D that the optical imaging system according to Embodiment 10 achieves good image quality.

Embodiment 11

Figure 21:
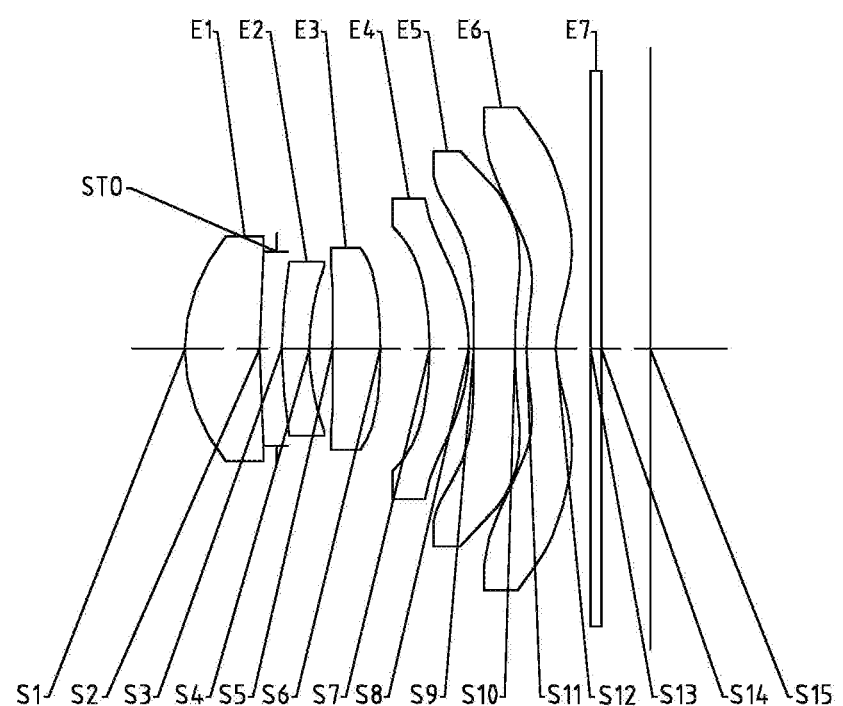
FIG. 21 is a schematic structural diagram illustrating a camera lens assembly according to Embodiment 11 of the present application.

The camera lens assembly according to Embodiment 11 of the present application is described below with reference to FIG. 21 to FIG. 22D. FIG. 21 is a schematic structural diagram illustrating a camera lens assembly according to Embodiment 11 of the present application.

As shown in FIG. 21, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 31 shows a surface form, a radius of curvature, a thickness, a material, and a conic constant of each lens of the camera lens assembly of Embodiment 11, wherein the unit for the radius of curvature and the thickness is millimeter (mm). Table 32 shows higher-order coefficients of the lens surfaces in Embodiment 11. Table 33 shows effective focal lengths of the lenses f1 to f6, a total effective focal length f of the camera lens assembly and a half field-of-view angle HFOV of the camera lens assembly of Embodiment 11. Here, the respective aspheric surface forms may be defined by the formula 1) given in the above embodiment.

TABLE 31

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 1.7032 | 0.7639 | 1.53 | 65.7 | 0.4294 |
| S2 | aspheric | 7.6608 | 0.1744 | | | −43.9722 |
| STO | spherical | infinite | 0.0500 | | | 0.0000 |
| S3 | aspheric | 3.4924 | 0.2826 | 1.67 | 20.4 | −32.4161 |
| S4 | aspheric | 2.2044 | 0.2356 | | | −14.1498 |
| S5 | aspheric | 16.4855 | 0.4889 | 1.55 | 56.1 | 97.0096 |
| S6 | aspheric | −5.8994 | 0.5033 | | | 27.9546 |
| S7 | aspheric | −3.6663 | 0.4000 | 1.64 | 23.5 | 1.5790 |
| S8 | aspheric | −1.8564 | 0.0500 | | | −0.7029 |
| S9 | aspheric | −16.6874 | 0.4205 | 1.64 | 23.5 | 85.3218 |
| S10 | aspheric | 8.4420 | 0.1157 | | | −92.2903 |
| S11 | aspheric | 1.8988 | 0.3000 | 1.54 | 55.8 | −21.2709 |
| S12 | aspheric | 1.0587 | 0.3541 | | | −6.6355 |
| S13 | spherical | infinite | 0.1110 | 1.52 | 64.2 | |
| S14 | spherical | infinite | 0.5000 | | | |
| S15 | spherical | infinite | | | | |

TABLE 32

| surface number | A4 | A6 | A8 | A10 | A12 |
|---|---|---|---|---|---|
| S1 | −2.6168E−02 | 5.8162E−02 | −2.6233E−01 | 6.3370E−01 | −9.8155E−01 |
| S2 | −1.7337E−02 | −5.3652E−02 | 3.6485E−01 | −1.1685E+00 | 2.2650E+00 |
| S3 | −1.6155E−02 | 9.2042E−02 | −7.7686E−01 | 3.3448E+00 | −8.2811E+00 |
| S4 | 1.0729E−01 | −3.9012E−01 | 2.3303E+00 | −1.0215E+01 | 3.0046E+01 |
| S5 | −6.7287E−02 | 1.4192E−01 | −9.6771E−01 | 2.9822E+00 | −4.6441E+00 |
| S6 | −1.4709E−02 | −2.5019E−01 | 1.2874E+00 | −4.5510E+00 | 1.0039E+01 |
| S7 | −4.0211E−02 | −1.2988E−02 | 3.3146E−01 | −1.1698E+00 | 1.9142E+00 |
| S8 | −4.8736E−02 | 2.1652E−01 | −3.0566E−01 | 2.1784E−01 | −8.3893E−02 |
| S9 | 4.2602E−02 | −1.5509E−01 | 8.4950E−02 | 2.2530E−02 | −6.0745E−02 |
| S10 | 2.4152E−01 | −5.7710E−01 | 6.1788E−01 | −4.3413E−01 | 2.0605E−01 |
| S11 | −8.7821E−02 | −1.0980E−01 | 4.7517E−02 | 5.0910E−02 | −4.9466E−02 |
| S12 | −1.4467E−01 | 4.6574E−02 | −2.2468E−02 | 2.0500E−02 | −1.1299E−02 |

| surface number | A14 | A16 | A18 | A20 |
|---|---|---|---|---|
| S1 | 9.6021E−01 | −5.7808E−01 | 1.9517E−01 | −2.8427E−02 |
| S2 | −2.7672E+00 | 2.0740E+00 | −8.7127E−01 | 1.5698E−01 |
| S3 | 1.2553E+01 | −1.1520E+01 | 5.8802E+00 | −1.2814E+00 |
| S4 | −5.6935E+01 | 6.6815E+01 | −4.4257E+01 | 1.2705E+01 |
| S5 | 1.3341E+00 | 6.5088E+00 | −9.2333E+00 | 3.9757E+00 |
| S6 | −1.4010E+01 | 1.2047E+01 | −5.8360E+00 | 1.2255E+00 |
| S7 | −1.8215E+00 | 1.0399E+00 | −3.3182E−01 | 4.5607E−02 |
| S8 | 2.9567E−02 | −1.4329E−02 | 4.5991E−03 | −5.6618E−04 |
| S9 | 3.7392E−02 | −1.0979E−02 | 1.5600E−03 | −8.4287E−05 |
| S10 | −6.4502E−02 | 1.2588E−02 | −1.3730E−03 | 6.3449E−05 |
| S11 | 1.8338E−02 | −3.5432E−03 | 3.5524E−04 | −1.4672E−05 |
| S12 | 3.4566E−03 | −6.0201E−04 | 5.6197E−05 | −2.1836E−06 |

TABLE 33

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 3.96 | −9.82 | 8.02 | 5.37 | −8.64 | −5.09 | 3.87 | 35.98 |

Figure 22A:
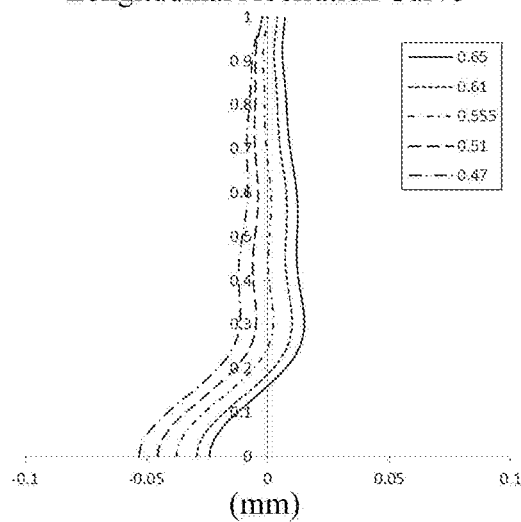
FIG. 22A shows a longitudinal aberration curve of the camera lens assembly according to Embodiment 11.
Figure 22B:
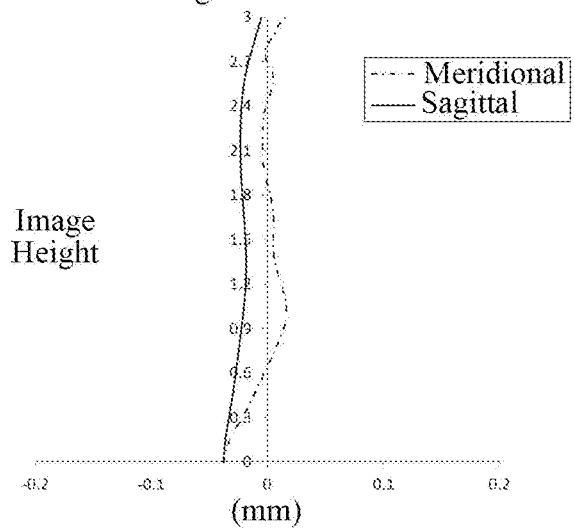
FIG. 22B shows an astigmatism curve of the camera lens assembly according to Embodiment 11.
Figure 22C:
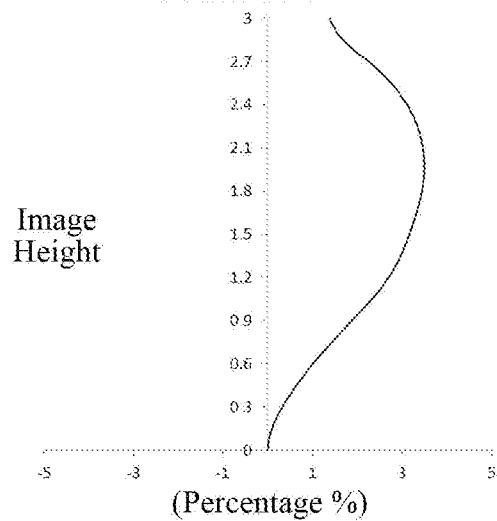
FIG. 22C shows a distortion curve of the camera lens assembly according to Embodiment 11.
Figure 22D:
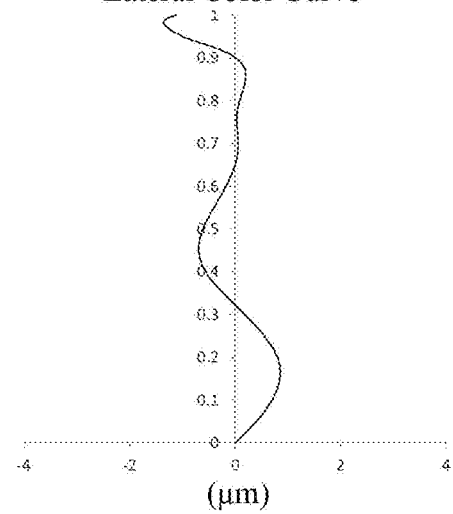
FIG. 22D shows a lateral color curve of the camera lens assembly according to Embodiment 11.

FIG. 22A shows a longitudinal aberration curve of the camera lens assembly according to Embodiment 11, representing deviations of focal points of light of different wavelengths converged after passing through a lens assembly. FIG. 22B shows an astigmatism curve of the camera lens assembly according to Embodiment 11, representing a curvature of a meridional image plane and a curvature of a sagittal image plane. FIG. 22C shows a distortion curve of the camera lens assembly according to Embodiment 11, representing amounts of distortion at different viewing angles. FIG. 22D shows a lateral color curve of the camera lens assembly according to Embodiment 11, representing deviations of different image heights on an image plane after light passes through the lens assembly. It can be seen from FIG. 22A to FIG. 22D that the camera lens assembly according to Embodiment 11 achieves good image quality.

Embodiment 12

Figure 23:
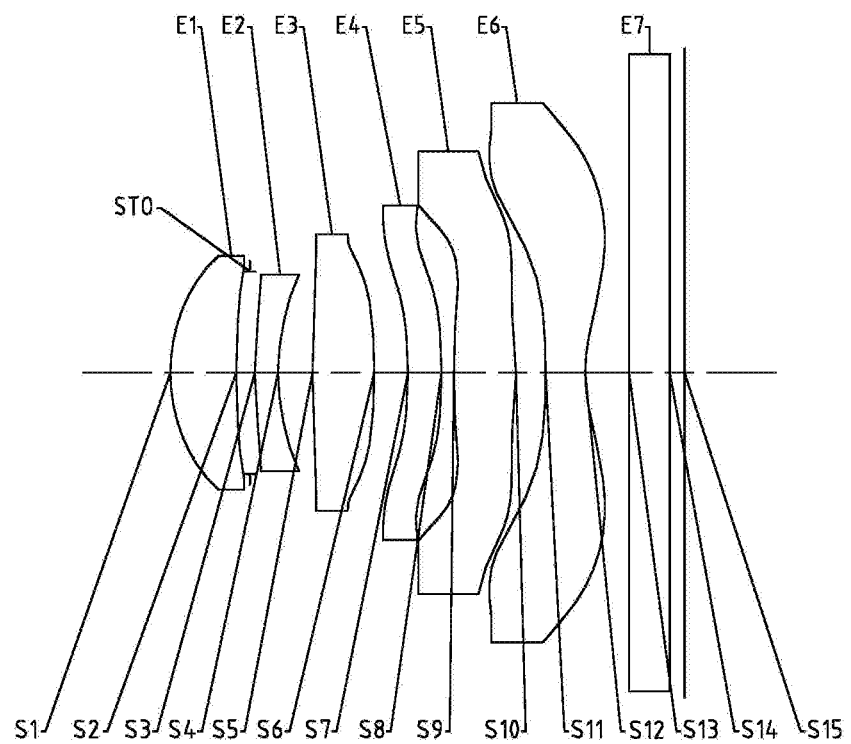
FIG. 23 is a schematic structural diagram illustrating a camera lens assembly according to Embodiment 12 of the present application.

The camera lens assembly according to Embodiment 12 of the present application is described below with reference to FIG. 23 to FIG. 24D. FIG. 23 is a schematic structural diagram illustrating a camera lens assembly according to Embodiment 12 of the present application.

As shown in FIG. 23, the camera lens assembly includes six lenses E1 to E6 arranged in sequence from an object side to an image side along an optical axis. The first lens E1 has an object side surface S1 and an image side surface S2; the second lens E2 has an object side surface S3 and an image side surface S4; the third lens E3 has an object side surface S5 and an image side surface S6; the fourth lens E4 has an object side surface S7 and an image side surface S8; the fifth lens E5 has an object side surface S9 and an image side surface S10; and the sixth lens E6 has an object side surface S11 and an image side surface S12. Alternatively, the camera lens assembly may further include a filter E7 having an object side surface S13 and an image side surface S14 and for filtering the infrared light. In the camera lens assembly of the present embodiment, an aperture STO may also be provided to adjust an amount of light entered. Light from an object passes through the surfaces S1 to S14 sequentially and is finally imaged on the image plane S15.

Table 34 shows a surface form, a radius of curvature, a thickness, a material, and a conic constant of each lens of the camera lens assembly of Embodiment 12, wherein the unit for the radius of curvature and the thickness is millimeter (mm). Table 35 shows higher-order coefficients of the lens surfaces in Embodiment 12. Table 36 shows effective focal lengths of the lenses f1 to f6, a total effective focal length f of the camera lens assembly and a half field-of-view angle HFOV of the camera lens assembly of Embodiment 12. Here, the respective aspheric surface forms may be defined by the formula 1) given in the above embodiment.

TABLE 34

| surface number | surface form | radius of curvature | thickness | material refractive index | material dispersion coefficient | conic constant |
|---|---|---|---|---|---|---|
| OBJ | spherical | infinite | infinite | | | |
| S1 | aspheric | 1.8890 | 0.7100 | 1.55 | 56.1 | −0.0294 |
| S2 | aspheric | 7.4413 | 0.1514 | | | −21.4979 |

TABLE 34-continued

| surface number | surface form | radius of curvature | thickness | material refractive index | material dispersion coefficient | conic constant |
|---|---|---|---|---|---|---|
| STO | spherical | infinite | 0.0500 | | | 0.0000 |
| S3 | aspheric | 3.6300 | 0.2500 | 1.67 | 20.4 | −41.9971 |
| S4 | aspheric | 2.1714 | 0.3723 | | | −9.7795 |
| S5 | aspheric | 7.9619 | 0.6661 | 1.55 | 56.1 | −54.5132 |
| S6 | aspheric | −8.6728 | 0.3647 | | | 15.8359 |
| S7 | aspheric | −5.1942 | 0.3619 | 1.64 | 23.5 | 3.0164 |
| S8 | aspheric | −6.1758 | 0.1340 | | | −0.4304 |
| S9 | aspheric | 14.3684 | 0.6699 | 1.55 | 56.1 | 51.8893 |
| S10 | aspheric | −2.8017 | 0.3203 | | | −0.0698 |
| S11 | aspheric | −8.2086 | 0.4270 | 1.54 | 55.8 | −0.8204 |
| S12 | aspheric | 1.7311 | 0.4734 | | | −3.8178 |
| S13 | spherical | infinite | 0.4400 | 1.52 | 64.2 | |
| S14 | spherical | infinite | 0.1588 | | | |
| S15 | spherical | infinite | | | | |

TABLE 35

| surface number | A4 | A6 | A8 | A10 | A12 |
|---|---|---|---|---|---|
| S1 | −8.2664E−04 | 2.4192E−02 | −6.1478E−02 | 9.8357E−02 | −7.3901E−02 |
| S2 | −2.3064E−02 | −2.4299E−02 | 3.1327E−01 | −9.7300E−01 | 1.7516E+00 |
| S3 | −4.2162E−02 | 1.0781E−02 | −4.4898E−02 | 3.4875E−01 | −8.5500E−01 |
| S4 | 4.1304E−03 | −4.1118E−02 | 3.3387E−01 | −8.8610E−01 | 1.4734E+00 |
| S5 | −2.0608E−02 | 3.5509E−03 | −1.3369E−02 | −2.3405E−02 | 9.6301E−02 |
| S6 | −2.8753E−02 | −3.8577E−02 | 2.6563E−02 | 2.5070E−02 | −9.9943E−02 |
| S7 | −1.8654E−02 | −9.0723E−02 | 1.9244E−01 | −2.8162E−01 | 2.8759E−01 |
| S8 | 3.0357E−02 | −2.2004E−01 | 2.8079E−01 | −2.3976E−01 | 1.5789E−01 |
| S9 | 1.2246E−01 | −1.9261E−01 | 1.1179E−01 | −4.5284E−02 | 1.0810E−02 |
| S10 | 2.3160E−01 | −9.3415E−02 | −3.1089E−02 | 4.7403E−02 | −2.2450E−02 |
| S11 | 6.6096E−03 | −8.9202E−02 | 8.1201E−02 | −4.03846−02 | 1.2332E−02 |
| S12 | −1.0976E−01 | 5.5483E−02 | −2.4448E−02 | 8.2687E−03 | −2.0388E−03 |

| surface number | A14 | A16 | A18 | A20 |
|---|---|---|---|---|
| S1 | 7.8352E−03 | 2.7752E−02 | −1.8261E−02 | 3.7358E−03 |
| S2 | −1.9485E+00 | 1.3177E+00 | −4.9616E−01 | 7.9889E−02 |
| S3 | 1.0874E+00 | −7.8539E−01 | 3.0528E−01 | −4.9700E−02 |
| S4 | −1.5619E+00 | 1.0124E+00 | −3.6088E−01 | 5.3522E−02 |
| S5 | −1.2255E−01 | 7.4684E−02 | −2.0215E−02 | 1.6907E−03 |
| S6 | 1.2793E−01 | −8.2447E−02 | 2.6673E−02 | −3.4033E−03 |
| S7 | −1.7522E−01 | 6.0883E−02 | −1.1204E−02 | 8.4883E−04 |
| S8 | −7.0021E−02 | 1.8780E−02 | −2.7326E−03 | 1.6538E−04 |
| S9 | 1.3072E−03 | −2.1725E−03 | 6.6105E−04 | −6.6335E−05 |
| S10 | 5.7431E−03 | −8.3210E−04 | 6.3795E−05 | −2.0026E−06 |
| S11 | −2.3084E−03 | 2.5707E−04 | −1.5630E−05 | 3.9978E−07 |
| S12 | 3.4568E−04 | −3.7377E−05 | 2.2850E−06 | −5.9492E−08 |

TABLE 36

| parameter | f1 (mm) | f2 (mm) | f3 (mm) | f4 (mm) | f5 (mm) | f6 (mm) | f (mm) | HFOV (deg) |
|---|---|---|---|---|---|---|---|---|
| value | 4.44 | −8.71 | 7.71 | −59.26 | 4.35 | −2.62 | 4.41 | 37.72 |

Figure 24A:
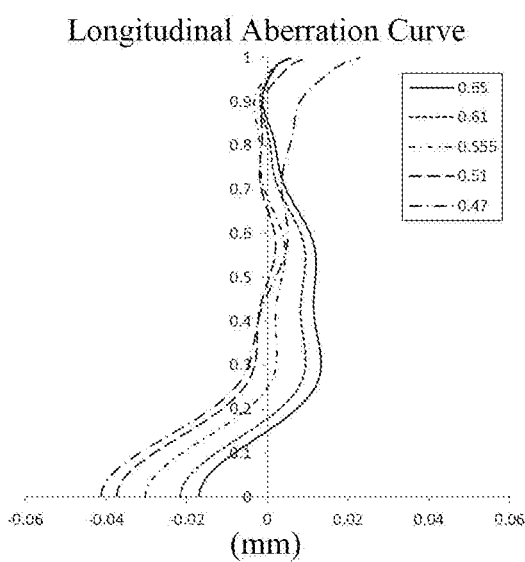
FIG. 24A shows a longitudinal aberration curve of the camera lens assembly according to Embodiment 12.
Figure 24B:
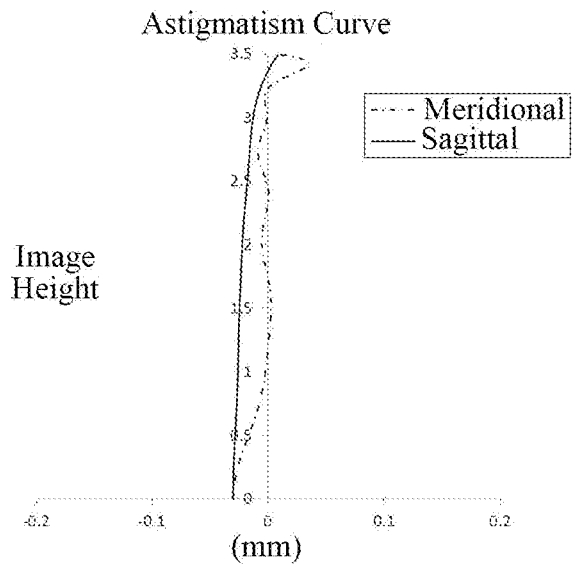
FIG. 24B shows an astigmatism curve of the camera lens assembly according to Embodiment 12.
Figure 24C:
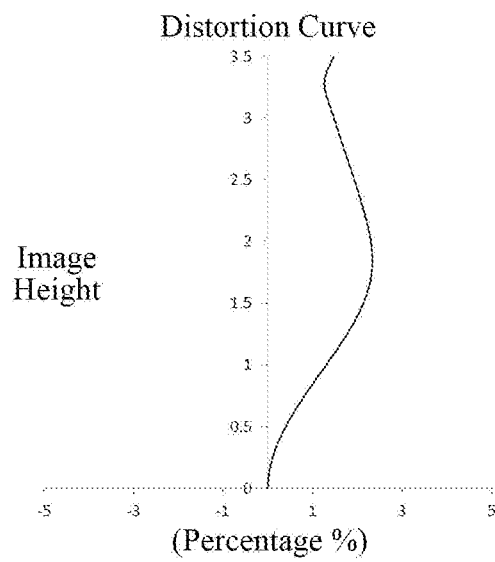
FIG. 24C shows a distortion curve of the camera lens assembly according to Embodiment 12.
Figure 24D:
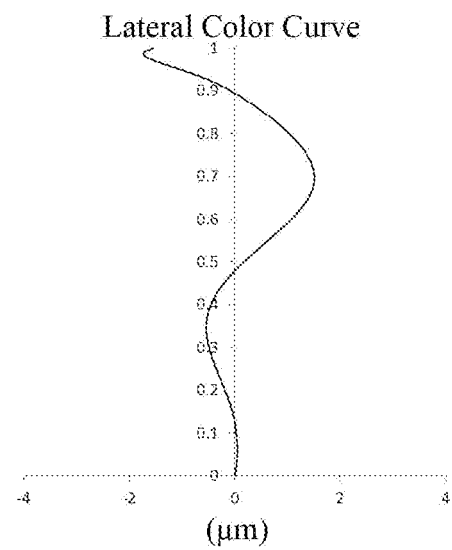
FIG. 24D shows a lateral color curve of the camera lens assembly according to Embodiment 12.

FIG. 24A shows a longitudinal aberration curve of the camera lens assembly according to Embodiment 12, representing deviations of focal points of light of different wavelengths converged after passing through a lens assembly. FIG. 24B shows an astigmatism curve of the camera lens assembly according to Embodiment 12, representing a curvature of a meridional image plane and a curvature of a sagittal image plane. FIG. 24C shows a distortion curve of the camera lens assembly according to Embodiment 12, representing amounts of distortion at different viewing angles. FIG. 24D shows a lateral color curve of the camera lens assembly according to Embodiment 12, representing deviations of different image heights on an image plane after light passes through the lens assembly. It can be seen from FIG. 24A to FIG. 24D that the camera lens assembly according to Embodiment 12 achieves good image quality.

In summary, Embodiment 1 to Embodiment 12 respectively satisfies relationships shown in Table 37 below.

TABLE 37

| Conditional expression | Embodiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| f/EPD | 1.70 | 1.70 | 1.80 | 1.79 | 1.69 | 1.80 | 1.80 | 1.70 | 1.80 | 1.80 | 1.70 | 1.80 |
| TTL/ImgH | 1.55 | 1.56 | 1.60 | 1.53 | 1.56 | 1.60 | 1.60 | 1.55 | 1.60 | 1.59 | 1.55 | 1.59 |
| SL/TTL | 0.77 | 0.76 | 0.85 | 0.83 | 0.77 | 0.85 | 0.85 | 0.76 | 0.86 | 0.86 | 0.80 | 0.84 |
| f1/f3 | 0.32 | 0.36 | 0.38 | 0.45 | 0.36 | 0.50 | 0.49 | 0.33 | 0.65 | 0.35 | 0.49 | 0.58 |
| f3/f4 | 2.01 | 1.83 | 0.05 | 1.52 | 1.79 | 0.05 | 0.02 | 2.02 | 0.16 | 0.60 | 1.49 | −0.13 |
| |f/f45| | 0.10 | 0.18 | 1.02 | 0.42 | 0.23 | 1.04 | 1.01 | 0.19 | 1.00 | 1.23 | 0.27 | 0.97 |
| CT3/(CT5 + CT6) | 0.64 | 0.67 | 0.48 | 0.66 | 0.64 | 0.59 | 0.62 | 0.63 | 0.53 | 0.46 | 0.68 | 0.61 |
| CT1/CT3 | 1.99 | 1.85 | 1.11 | 1.45 | 1.87 | 1.19 | 1.20 | 1.99 | 1.08 | 1.19 | 1.56 | 1.07 |
| T56/CT6 | 0.37 | 0.56 | 0.53 | 0.52 | 0.56 | 0.70 | 0.71 | 0.35 | 0.55 | 0.69 | 0.39 | 0.75 |
| DT11/DT22 | 1.51 | 1.43 | 1.29 | 1.44 | 1.41 | 1.29 | 1.29 | 1.51 | 1.29 | 1.29 | 1.36 | 1.19 |
| R1/R4 | 1.08 | 1.00 | 0.49 | 0.71 | 1.01 | 0.87 | 0.61 | 1.07 | 0.79 | 0.78 | 0.77 | 0.87 |
| f/R12 | 3.47 | 3.50 | 2.89 | 2.89 | 3.49 | 2.78 | 2.70 | 3.55 | 2.81 | 2.87 | 3.66 | 2.55 |

The present application also provides a camera device, and a photosensitive element of the camera device may be a charged coupled device (CCD) or a complementary metal-oxide semiconductor (CMOS). The camera device may be an independent camera device such as a digital camera, or a camera module integrated on a mobile electronic device such as a mobile phone. The camera device is equipped with the camera lens assembly as described above.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A camera lens assembly, having a total effective focal length f and an entrance pupil diameter EPD, and comprising sequentially, from an object side to an image side along an optical axis, a first lens, a second lens, a third lens, a fourth lens, a fifth lens, and a sixth lens,
   the first lens having a positive focal power, the second lens having a negative focal power, the third lens having a positive focal power, the fourth lens having a positive focal power or a negative focal power, the fifth lens having a positive focal power or a negative focal power, and the sixth lens having a negative focal power; and
   wherein the total effective focal length f and the entrance pupil diameter EPD satisfy: f/EPD≤1.8,
   wherein an axial distance TTL from an object side surface of the first lens to an image plane of the camera lens assembly and half a diagonal length ImgH of an effective pixel area on the image plane of the camera lens assembly satisfy: TTL/ImgH≤1.6;
   wherein an air spacing between the fifth lens and the sixth lens on the optical axis T56 and a center thickness of the sixth lens CT6 satisfy: 0.3≤T56/CT6≤0.8, and
   wherein an effective focal length of the third lens f3 and an effective focal length of the fourth lens f4 satisfy: −0.2<f3/f4≤2.1.

2. The camera lens assembly according to claim 1, wherein
   an object side surface of the first lens is a convex surface;
   an image side surface of the second lens is a concave surface;
   an image side surface of the fourth lens is a convex surface; and
   an image side surface of the sixth lens is a concave surface at a paraxial and has at least one point of inflexion.

3. The camera lens assembly according to claim 1, wherein an aperture stop is provided between the first lens and the second lens, and an axial distance SL from the aperture stop to the image plane of the camera lens assembly and the axial distance TTL from the object side surface of the first lens to the image plane of the camera lens assembly satisfy: 0.7≤SL/TTL≤0.9.

4. The camera lens assembly according to claim 1, wherein an effective focal length of the first lens f1 and the effective focal length of the third lens f3 satisfy: 0.2<f1/f3<0.8.

5. The camera lens assembly according to claim 1, wherein a combined focal length of the fourth lens and the fifth lens f45 satisfies: |f/f45|≤1.3.

6. The camera lens assembly according to claim 1, wherein a center thickness of the third lens CT3, a center thickness of the fifth lens CT5 and a center thickness of the sixth lens CT6 satisfy: 0.4≤CT3/(CT5+CT6)≤0.7.

7. The camera lens assembly according to claim 1, wherein a center thickness of the first lens CT1 and the center thickness of the third lens CT3 satisfy: $1.0 \leq CT1/CT3 \leq 2.0$.

8. The camera lens assembly according to claim 1, wherein a radius of curvature of the image side surface of the sixth lens R12 satisfies: $2.5 < f/R12 < 4.0$.

9. A camera lens assembly, comprising sequentially, from an object side to an image side along an optical axis, a first lens, a second lens, a third lens, a fourth lens, a fifth lens, and a sixth lens, wherein,
- the first lens has a positive focal power, and an object side surface of the first lens is a convex surface;
- the second lens has a negative focal power, and an image side surface of the second lens is a concave surface;
- the third lens has a positive focal power;
- the fourth lens has a positive focal power, and an image side surface of the fourth lens is a convex surface;
- the fifth lens has a positive focal power or a negative focal power; and
- the sixth lens has a negative focal power,
- wherein an air spacing between the fifth lens and the sixth lens on the optical axis T56 and a center thickness of the sixth lens CT6 satisfy: $0.3 \leq T56/CT6 \leq 0.8$,
- wherein the effective focal length of the third lens f3 and an effective focal length of the fourth lens f4 satisfy: $0.6 \leq f3/f4 \leq 2.1$, and
- wherein an image side surface of the sixth lens is a concave surface at a paraxial and has at least one point of inflexion.

10. The camera lens assembly according to claim 9, wherein a total effective focal length f and an entrance pupil diameter EPD of the camera lens assembly satisfy: $f/EPD \leq 1.8$.

11. The camera lens assembly according to claim 9, wherein an axial distance TTL from the object side surface of the first lens to an image plane of the camera lens assembly and half a diagonal length ImgH of an effective pixel area on the image plane of the camera lens assembly satisfy: $TTL/ImgH \leq 1.6$.

12. The camera lens assembly according to claim 9, wherein an aperture stop is provided between the first lens and the second lens; and
- an axial distance SL from the aperture stop to an image plane of the camera lens assembly and an axial distance TTL from the object side surface of the first lens to the image plane of the camera lens assembly satisfy: $0.7 \leq SL/TTL \leq 0.9$.

13. The camera lens assembly according to claim 9, wherein a maximum effective radius of the object side surface of the first lens DT11 and a maximum effective radius of the image side surface of the second lens DT22 satisfy: $0.1 \leq DT11/DT22 \leq 1.6$.

14. The camera lens assembly according to claim 9, wherein a radius of curvature of the object side surface of the first lens R1 and a radius of curvature of the image side surface of the second lens R4 satisfy: $0 < R1/R4 < 1.5$.

15. The camera lens assembly according to claim 9, wherein a combined focal length of the fourth lens and the fifth lens f45 satisfy: $|f/f45| \leq 1.3$.

* * * * *